T. G. MARTIN.
TELEPHONE SYSTEM.
APPLICATION FILED AUG. 11, 1913.

1,227,474.

Patented May 22, 1917.
7 SHEETS—SHEET 1.

WITNESSES
Albert Andersen.
G. Yanochowski.

INVENTOR
Talbot G. Martin
By Bulkley & Swenarton
ATTORNEYS.

T. G. MARTIN.
TELEPHONE SYSTEM.
APPLICATION FILED AUG. 11, 1913.

1,227,474.

Patented May 22, 1917.
7 SHEETS—SHEET 5.

WITNESSES
Albert Andersen.
G. Yanochowski.

INVENTOR:
Talbot G. Martin
By Bulkley & Swenarton
ATTORNEYS.

T. G. MARTIN.
TELEPHONE SYSTEM.
APPLICATION FILED AUG. 11, 1913.

1,227,474.

Patented May 22, 1917
7 SHEETS—SHEET 7.

WITNESSES
Albert Andersen.
G. Ganochowski

INVENTOR:
Talbot G. Martin
By Bulkley & Durnarton
ATTORNEYS.

UNITED STATES PATENT OFFICE.

TALBOT G. MARTIN, OF CHICAGO, ILLINOIS, ASSIGNOR TO AUTOMATIC ELECTRIC COMPANY, OF CHICAGO, ILLINOIS, A CORPORATION OF ILLINOIS.

TELEPHONE SYSTEM.

1,227,474.   Specification of Letters Patent.   Patented May 22, 1917.

Application filed August 11, 1913.   Serial No. 784,097.

*To all whom it may concern:*

Be it known that I, TALBOT G. MARTIN, a citizen of the United States of America, and resident of Chicago, Cook county, Illinois, have invented a certain new and useful Improvement in Telephone Systems, of which the following is a specification.

My invention relates to improvements in telephone systems, and more particularly to improved means for handling long distance or toll calls in connection with an automatic telephone system. When a long distance call comes into an automatic exchange, it comes in on a manual board and the operator, upon learning the number of the subscriber desired, extends the connection through a suitable cord circuit to a selector switch in the automatic exchange and then, by operating her calling device, extends the connection through the automatic switches to the subscriber called for in the usual manner.

It is desirable to give these long distance calls preference over local calls, as trunk lines between cities should not be tied up on a single call any longer than necessary. It often times happens that the operator who receives the long distance call finds that the desired called subscriber's line is busy. With the ordinary connector switches employed it is impossible for the operator to obtain a connection with this busy line. It is desirable, however, that in such case the operator be able to advise the desired subscriber who is thus involved in another connection that he is wanted for a long distance call. In order to accomplish this purpose I provide a special form of connector switch by which the operator can make connection with this busy line and advise the subscriber of the desired information.

A further object of my invention is to provide the operator with means whereby she can ascertain whether or not a line is engaged in a local connection or in another long distance connection. Of course, if a line is already engaged in a long distance connection it would be inadvisable and undesirable to break in on this connection and advise the subscriber that he is wanted for another long distance connection. It is only when the subscriber is involved in a local connection that it is desirable to advise the subscriber that he is wanted for a long distance connection, so that the subscribers can break the local connection and permit the completion of the long distance connection.

I therefore provide means for giving to the operator distinctive forms of busy signals, so that the operator can tell whether the busy line is a calling automatic line or a called automatic line involved in a local connection, or a called automatic line involved in a manual or long distance connection.

A further specific object of my invention is the provision of means whereby, when a line is in use, the multiple private contacts of the line are connected to ground through one of a plurality of busy signaling machines, depending upon whether the line is an automatic calling line or a called line involved in a local automatic connection, or one involved in a long distance manual connection.

In order that my invention may be more clearly understood, I have illustrated, in diagrammatic form, a telephone system which embodies the features of my invention. In this connection I have chosen to illustrate an automatic system involving switches of certain well-known types, together with manual apparatus which is employed for establishing toll connections, which is likewise of a well-known form. My invention, however, is equally as well adapted for use with other forms of automatic switches and cord circuits, and the present system is merely for the purpose of illustrating one specific embodiment of my invention.

In the accompanying drawings Figure 1 is a diagrammatic layout of a telephone system in connection with which I have chosen to illustrate my invention.

Figure 1:
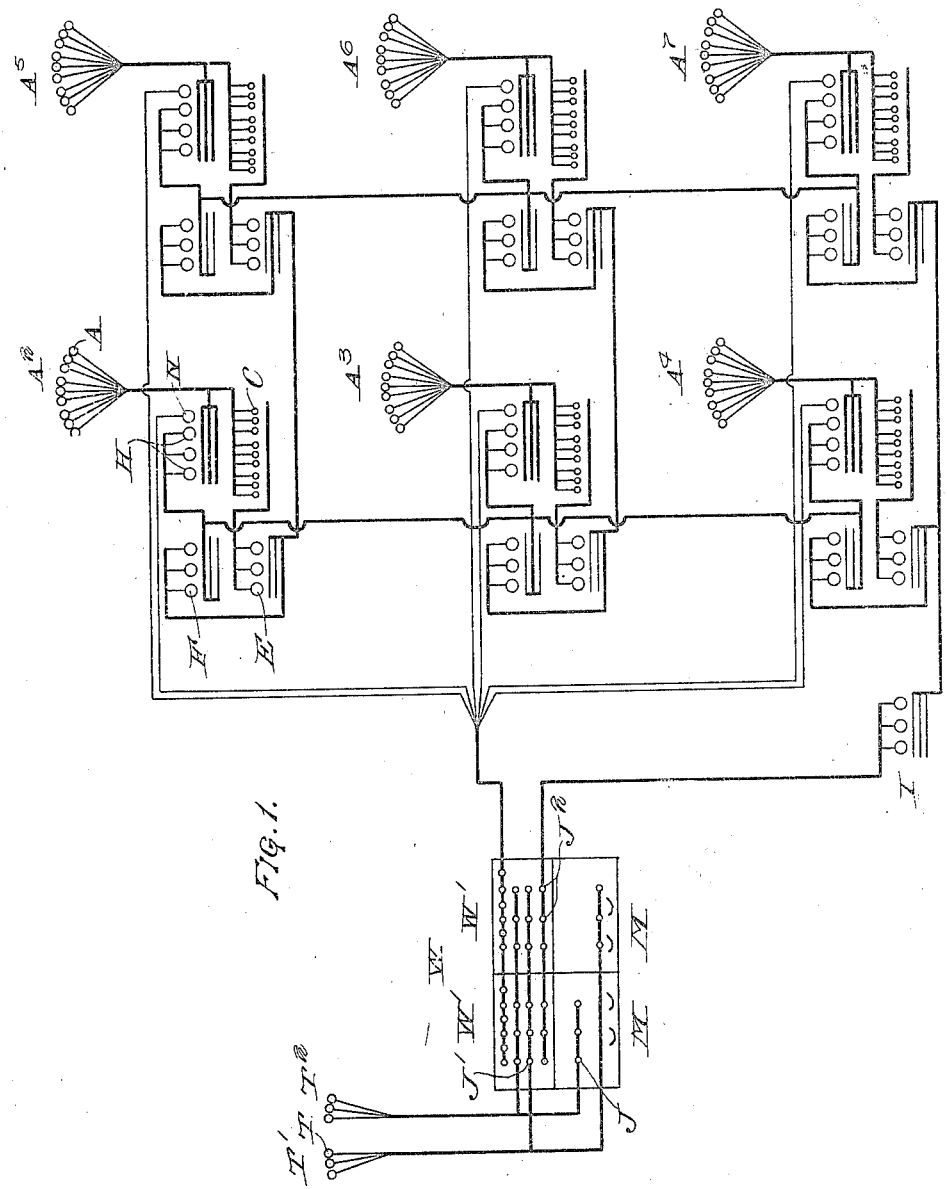

The telephone system illustrated in Fig. 1 comprises an automatic exchange and a manual exchange. The manual exchange is represented by a switchboard W comprising a plurality of operators' positions W'. At T' and T² are shown groups of substations T the lines of each of which terminate in an answering jack J on one operator's position W' and in a multiple jack J' on each operator's position in the usual and well-known manner. Suitable cord circuits M are provided for establishing connections.

The automatic exchange is of a well-known type, comprising subscribers' individual preselector switches C, first selector switches E, second selector switches F and connector switches H. In the drawings there are represented two thousands of an exchange of ten thousand lines capacity on a scale of three to ten. The subscribers' stations A are divided into groups $A^2$, $A^3$, $A^4$, etc., usually of one hundred lines each. On a scale of three to ten, therefore, the three groups $A^2$, $A^3$ and $A^4$ represent one complete thousand and the groups $A^5$, $A^6$ and $A^7$ represent another thousand. With each group of subscribers' lines there is associated in the central office a group of individual or line switches C, one for each line, a group of first selectors E, a group of second selectors F and a group of connectors H. The selector and connector switches represented herein comprise banks of contacts arranged in horizontal rows or levels, usually ten in number. These levels are represented by horizontal lines which extend beneath all the switches of a group to indicate that the corresponding contacts of all the switches of the group are multipled together. All the line switches C belonging to one group of subscribers' lines have common access to a group of first selectors E. The bank contacts of the first selectors E of corresponding groups or hundreds are multipled throughout the different thousands. The first level of these first selectors is connected to trunk lines leading to second selector switches F associated with the first thousand, the second level of the first selectors is connected to trunk lines leading to second selectors associated with the second thousand, etc. The bank contacts of all the second selectors F associated with a given thousand are multipled together and the first level is connected to trunk lines leading to connector switches H, which have access to the subscribers' lines of the first hundred of that thousand, the second level is connected to trunk lines leading to connectors which have access to the lines of the second hundred, etc. This trunking arrangement of an automatic exchange is in general well known in the art and it is not thought necessary to describe it in further detail herein.

In order to form a means of communication between the automatic and manual exchanges, there is provided a number of trunk lines leading from multiple jacks J² on the manual exchange to selector switches I in the automatic exchange, which selectors correspond in function to the subscribers' first selector switches E. The bank contacts of the operators' selectors I may be multipled with those of some of the subscribers' selectors E, as indicated. In addition to the trunk lines leading from the manual exchange to the selectors I in the automatic exchange, there are a number of trunk lines leading to special connector switches N in the automatic exchange. There is one of these special connectors for each of the groups $A^2$, $A^3$, $A^4$, etc. These special connectors, as will be described later, are used by the operator only after she has called the subscriber over one of the selectors I and the regular switches in the automatic exchange and found the line busy. These special connectors H are adapted to call in on a busy line, so that the operator may inform a busy automatic subscriber that a manual or long distance subscriber desires connection with him.

Although in the above description of the system shown in Fig. 1 reference has been made to an automatic exchange and to a manual exchange, it is to be understood that this does not mean that the manual part of the system is necessarily a separate and distinct exchange. It may be simply a manual switchboard which is usually installed in automatic exchanges for the purpose of handling long distance or toll calls.

In Figs. 2, 3, 4, 5, 6 and 7 the different parts of the apparatus are designated by the same reference characters, in so far as is consistent, as in the diagrammatic Fig. 1.

The automatic substation A (Fig. 2) comprises the usual receiver 2, transmitter 3, ringer 4 and condenser 5. Being an automatic substation it is also provided with a suitable call-sending mechanism for controlling the automatic switches, which mechanism is represented diagrammatically by a pair of impulse springs 6 and 7 and an impulse wheel 8, which latter may be controlled in a well-known manner through the medium of a dial provided with finger holes in such a way that the impulse springs may be momentarily separated a number of times corresponding to the respective digits of the number of the called subscriber.

The subscriber's individual switch C is of the general form of subscriber's switch shown in British patent to R. W. James No. 26,301 of 1906, more closely resembling, however, the particular type shown in British patent to T. G. Martin No. 1419 of 1910. This line switch comprises, among other details, a plunger (not shown) attached to the end of a so-called plunger arm 9, which arm is controlled by a magnet 10 comprising an operating winding 11 and a holding winding 12. This magnet also controls the cut-off armature 13. The winding 11 operates both the plunger arm 9 and the armature 13, while the winding 12 is strong enough to only operate the armature 13 and hold the plunger arm 9 in its operated position. When the plunger arm 9 is operated its plunger is forced into a bank of contact springs, forcing the springs 14, 15, 16 and 17 into engagement with the springs 18, 19, 20 and 21, respectively. Although only one set of springs, i. e., 14–21, is shown, each line switch is provided with a plurality of such sets, each forming the terminal of a trunk line leading to a first selector switch E. Each trunk line is connected in multiple to the corresponding springs of all the line switches of the group which is controlled by the master switch D. The switch C is controlled by the subscriber through the medium of the line relay 22, which relay is preferably slow acting—that is, slow to release its armature upon deënergizing.

The master switch D is of the general type of master switches shown in British Patent No. 26,301 of 1906, above referred to, being, however, of the particular type disclosed in said British Patent No. 1419 of 1910. The function of the master switch, as is well known, is to maintain the plungers of all the idle line switches in position to engage the terminal of an idle trunk line. The connector private bank contacts of the line are normally connected over a conductor 23 and through the spring 24 and contact point 25 to the bank contact spring 16 and cut-off winding 12. Upon the operation of the line switch, however, the spring 24 is disengaged from the contact point 25 and brought into contact with the contact point 26, whereby the connector private bank contacts are connected to ground G′ through the secondary winding of the transformer of a busy signaling machine Q. Associated with the line A there is shown a call register 28 which is controlled by a double-wound magnet 29.

The first selector switch E is of the general type of selector switches disclosed in United States Letters Patent No. 815,321, granted March 13, 1906, to Keith, Erickson and Erickson, except that the so-called side switch is omitted. Among other details, the selector E comprises a bank of contacts arranged in horizontal rows or levels which are adapted to be engaged by a set of wipers 30, 31 and 32 carried upon a shaft (not shown), which shaft has vertical movement controlled by the vertical magnet 33 and rotary movement controlled by the rotary magnet 34. The operations of the switch are controlled through the medium of the double-wound line relay 35. Means for permitting the switch to be restored to normal position are provided in the release magnet 36, which, upon energizing, withdraws the retaining pawls from the shaft. The spring contacts 37 and 38 are permitted to close only when the switch shaft has been raised one or more steps from its lowest position. The relays 39 and 40 are slow acting relays—that is, relays which deënergize slowly after their energizing circuits are broken. This slow action is usually obtained by placing a ring of copper around one end of the core of the relay.

The second selector F, as well as the selector I (Fig. 5), is the same as the selector E.

The connector switch H (Fig. 3) is of the general type of connector switches disclosed in United States Letters Patent No. 815,176, granted March 13, 1906, to Keith, Erickson and Erickson, the circuits, however, being modified to adapt the switch to operate in a system in which the central office apparatus is controlled by impulses delivered over the two sides of the line in series. Like the selectors, the connector is provided with a shaft (not shown) carrying the wipers 41, 42 and 43 and is controlled by the vertical magnet 44 and the rotary magnet 45. The usual side switch comprising the wipers 46, 47, 48 and 49 is controlled by the private magnet 50 in the usual and well-known manner. The magnet 250 is the usual release magnet. The line relay 51 is connected with the line through the reversing springs of a so-called back-bridge relay 52, through the windings of which latter relay the called line is provided with talking current. The ringer relay 253 is the means through which the application of ringing current to the called line is controlled. At Q′ and Q² there are shown two busy signaling machines which are connected to the front and back contacts, respectively, of the spring 54 of a relay 53, which relay is included in the holding circuit which the connector switch extends back to the selector switches. The complete function and operation of this relay will be fully described hereinafter. The busy signaling machines, as represented herein, comprise an induction coil or transformer the primary winding of which is included in a local circuit with a battery and two interrupters, one of low frequency and the other of high frequency. Through the medium of these interrupters an intermittent interrupted current is supplied to the primary winding of the transformer, which induces an intermittent alternating current in the secondary winding, whereby, when said winding is connected with a subscriber's line, said subscriber is given an intermittent buzzing sound in his receiver. The low frequency interrupters of the two busy machines Q′ and Q² have different frequencies, so that the buzzing produced by one machine is of a different character than that produced by the other.

Figure 2:
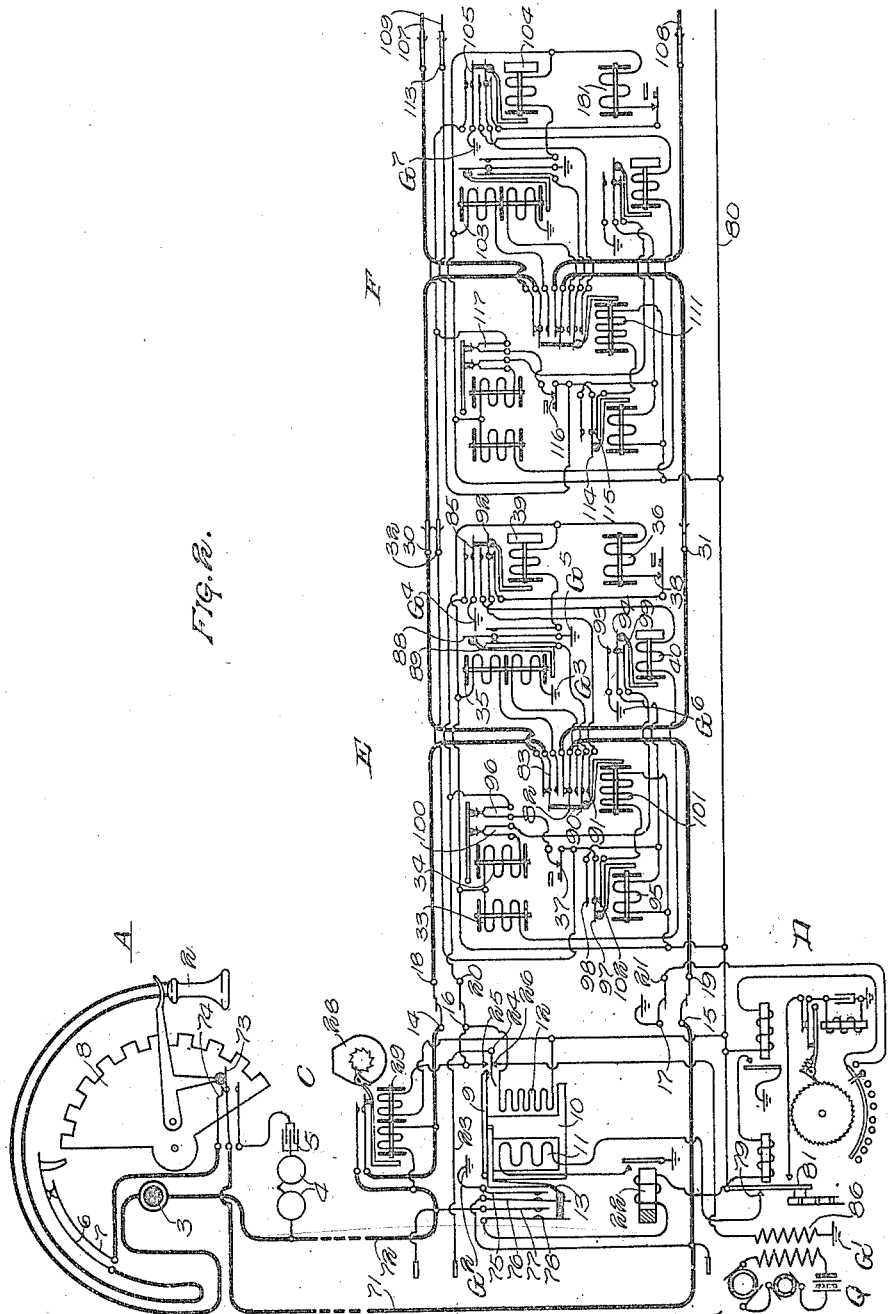
Figs. 2 and 3 show a complete connection between two automatic subscribers' stations in said system.

The substation A' and its individual switch C' are in all respects the same as the substation A and switch C (Fig. 2).

The substation T (Fig. 4) is an ordinary local battery manual substation, comprising a transmitter 55, receiver 56, induction coil 57, magneto 58 and ringer 59. At the central office the line is provided with the usual answering jack J, one or more multiple jacks J', the line relay 60, cut-off relay 61, line lamp 62 and a visual busy signal 63 associated with each multiple jack. The operator's cord circuit M resembles the usual cord circuit employed in manual systems in that it comprises an answering plug P', a calling plug P², calling and answering supervisory lamps 65 and 66 and suitable relays for controlling the circuits thereof. The relay 67 in the calling end of the cord is a polarized relay. This cord circuit, as shown, is adapted to complete connection with either another manual substation, such as the substation T, or with a trunk line leading to the automatic exchange, or with an ordinary common battery line. When the relay 68 is in its normal position, the circuits of the relay 67 are adapted for use in connection with a local battery line, or with a trunk line leading to the automatic exchange; but when the relay 68 is energized, the circuits of the relay 67 are adapted for use in connection with a common battery manual line or a similar line.

The trunk lines which lead from the manual switchboard to the automatic exchange, as has been explained in connection with Fig. 1, terminate in a multiple jack J² on the manual switchboard. The sleeve conductors of the jacks J² are connected to battery through a relay 69 which controls the circuit of a visual busy signal 70 associated with each multiple jack.

The trunk lines leading from the manual switchboard to the connector switches N (Figs. 1 and 6) are, at the manual switchboard end thereof, similar to those which lead to the selector switches I. The connector N is in general similar to the connector H (Fig. 3), there being, however, certain modifications in the circuit connections and mode of operation, as will be fully described hereinafter. The connector H' shown in Fig. 7 is similar to the connector H (Fig. 3), with certain modifications in the busy test circuit, which will appear from the detailed description which is to follow.

For the purpose of supplying current for operating the central office apparatus and for talking purposes there is shown throughout the drawings a plurality of batteries B having one terminal grounded at G. There need be in practice, however, only one such battery, or preferably one battery in each exchange.

A general description of the apparatus having been given, it will now be explained how connection is extended from the calling substation A to the called substation A', the number of which latter will be assumed to be 2220. Since the automatic switching apparatus disclosed herein is in general well known in the art, and is described in the publications hereinabove referred to, its operation will be explained in a more or less general manner. Upon the removal of the receiver from the switch hook at the substation A preparatory to making a call, the talking circuit of the substation is bridged across the line conductors 71 and 72 by the hook switch springs 73 and 74, whereby the circuit of the line relay 22 of the switch C is closed. This circuit extends from ground G² through the springs 75 and 76, line 71, substation A, line 72, springs 77 and 78 and the relay 22 to the battery lead 80, thence through the battery B to ground G. The relay 22, upon energizing, closes the circuit of the operating winding 11, which operates to disconnect the relay 22 from the line through the medium of the armature 13, and to thrust the plunger of the switch into the terminal of the trunk before which it is being held by the master switch, whereby the line circuit is extended through the springs 14 and 18 and 15 and 19 to an idle first selector switch E. The line relay 35 of the selector switch E is thereupon energized over a circuit extending from ground G³ through the lower winding of said relay, back contact of the switching relay spring 82, thence over the heavy conductors to and through the substation A and back over the other side of the line, through the left-hand winding of the meter magnet 29, back contact of the switching relay spring 83 in the selector and the upper winding of the line relay 35 to the battery lead 80. The relay 35, upon energizing, closes the circuit of the relay 39, which in turn, upon energizing, closes a circuit extending from ground G⁴ through the springs 85, line switch bank springs 20 and 16 and the holding winding 12 to the battery lead 80. The energization of this winding serves to hold the switch C in its operated position after the circuit of the winding 11 is broken by the relay 22, which deënergizes shortly after it is disconnected from the line. The energization of the relay 39 at the selector E also completes a circuit extending from ground G⁴ to the springs 85, 20 and 16 and through the right-hand winding of the meter magnet 29 to the battery lead 80. The current in this winding is in opposition to the line current flowing through the other winding, and the magnet is therefore not operated at this time. Upon the operation of the switch C, the connector private bank contacts of the calling line are provided with a guarding ground potential extending from ground G' through the secondary winding 86 of the busy signaling machine Q, contact point 26, spring 24 and the conductor 23. Upon the closure of the springs 17 and 21 by the operation of the switch C, the master switch D operates in a well-known manner to advance the plungers of the idle line switches to a position opposite an idle trunk line.

The calling subscriber now operates his calling device for the first digit 2 of the called number, whereby the substation impulse springs 6 and 7 are separated twice momentarily, each time breaking the circuit of the selector line relay 35. The relay 39 of the selector being slow acting does not deënergize during the momentary interruptions of its circuit by the relay 35, and consequently, each time the latter relay deënergizes, an impulse is transmitted over the circuit extending from ground $G^5$ through the springs 88 and 89, 90 and 91, spring 92 and its front contact, relay 40 and the vertical magnet 33 to the battery lead 80. The vertical magnet receives two impulses over this circuit and operates to raise the switch shaft and wipers two steps to a position opposite the second row or level of bank contacts, and at the same time the shaft-controlled contacts 37 and 38 are closed. The slow acting relay 40 is maintained in its energized position continuously while impulses are being transmitted to the vertical magnet through it and, in its energized position, closes a circuit from ground $G^6$ through the springs 93 and 94 and the relay 95 to the battery lead 80. The relay 95, upon energizing, forms a locking circuit for itself extending from ground $G^4$ at the relay 39, through the springs 85, springs 96 (which are controlled by the rotary magnet 34), shaft contact 37 and the springs 97 and 98 and its own winding to the battery lead 80. Thus upon the deënergization of the relay 40 after the last impulse is delivered to the vertical magnet, the relay 95 remains energized and the circuit of the rotary magnet 34 is closed, which circuit extends from ground $G^4$ at the relay 39 through the springs 85, 96, 37, 97, 98, 94, 99 and 100 and magnet 34 to the battery lead 80. The magnet 34, upon energizing, rotates the wipers one step and, by opening the spring contacts 100 and 96, disconnects ground $G^4$ from itself and from the relay 95. If the first trunk line of the second level is idle, the relay 95 deënergizes as soon as the spring contact 96 is opened. If this trunk line is busy, however, the private wiper 32 finds the contact which it engages provided with a guarding ground potential, which is transmitted to the relay 95 through its springs 97 and 98 and thereby prevents it from deënergizing. The magnet 34, however, deënergizes when the spring contact 100 is broken, regardless of whether the relay 95 remains energized or not. If the relay 95 remains energized, the circuit of the rotary magnet will be again closed as soon as its armature drops back far enough to close the contacts 100 and 96. The rotary magnet will therefore operate in a manner similar to that of a buzzer to advance the wipers step by step over the contacts until the non-grounded contact of an idle trunk line is reached by the wiper 32, whereupon the relay 95 deënergizes. The relay 95, upon deënergizing, whether after one or several operations of the rotary magnet, permanently breaks the circuit of the magnet 34 and closes the circuit of the switching relay 101, which circuit extends from ground $G^4$ through the springs 85, 96, 37, 97, 102 and the relay 101 to the battery lead 80. The relay 101, upon energizing, disconnects the line relay 35 from the line and extends the line connection over the heavy conductors shown through the wipers 30 and 31 to the second selector F. The line relay 103 of the switch F thereupon becomes energized and closes the circuit of the relay 104, which in turn, upon energizing, completes a circuit extending from ground $G^5$ through the springs 105, wiper 32 of the switch E and springs 97 and 102 and relay 101 to the battery lead 80. This circuit maintains the relay 101 energized after its original energizing circuit is broken by the relay 39, which deënergizes shortly after the line relay 35 is disconnected from the line. The relay 104 of the selector F also maintains a guarding ground potential upon the private bank contacts of the trunk line in the banks of the first selector switches E which have access thereto.

Figure 3:
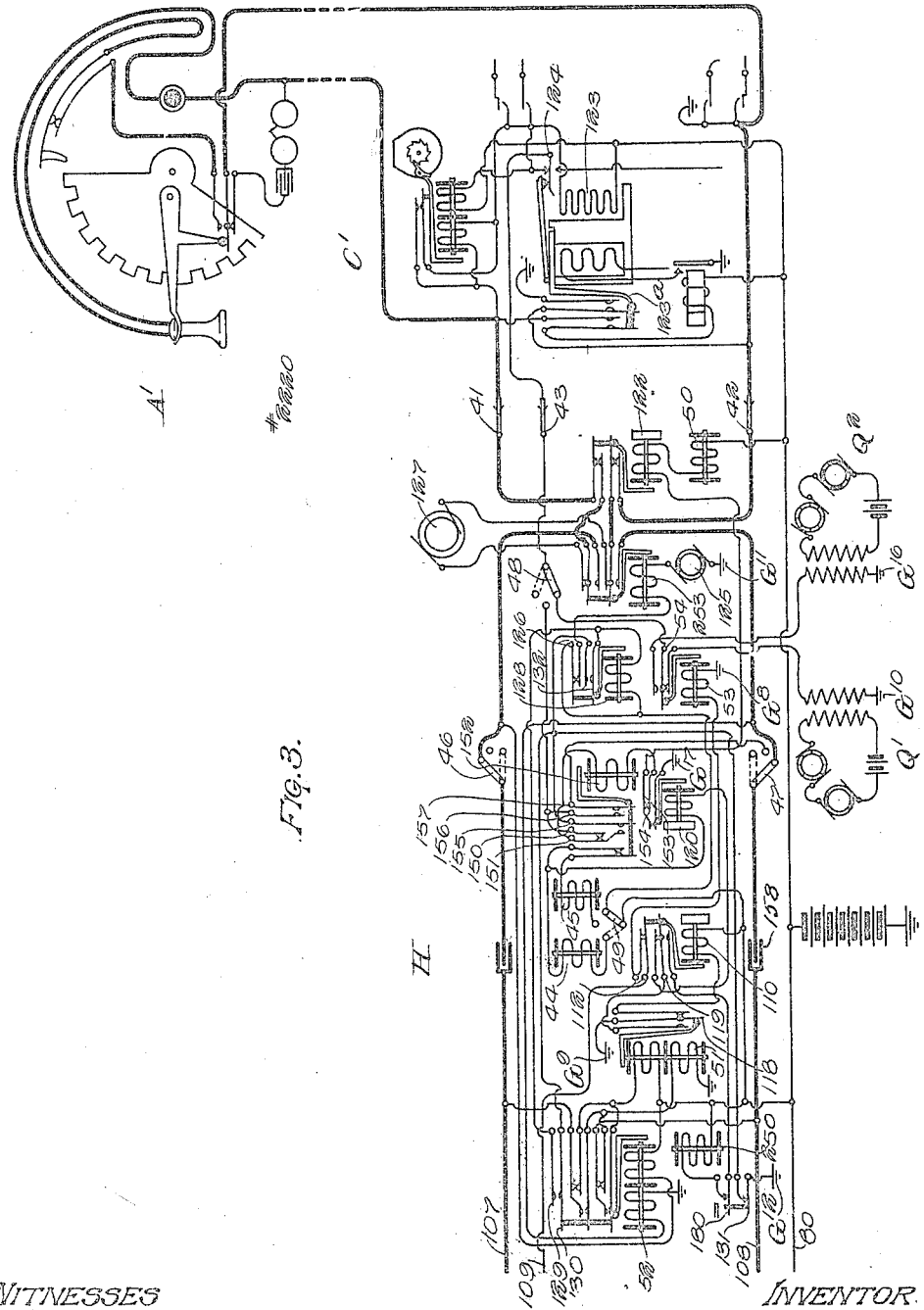

When the substation calling device is operated for the second digit 2, the selector F operates in the same manner as explained for the selector E to extend the connection over the trunk conductors 107, 108 and 109 to the connector H (Fig. 3). The line relay 51 of the connector thereupon becomes energized and closes the circuit of the relay 110. The relay 110, upon energizing, provides a holding circuit for the relays 111, 101 and 12 of the switches F, E and C, respectively. This circuit extends from ground $G^8$ at the connector switch through the relay 53, springs 112, conductor 109, wiper 113, thence through the springs 114 and 115 and the relay 111 to the battery lead 80, and also through the contacts 116 and 117, wiper 32 of the selector E and through the relays 101 and 12 over the circuits already traced. The right-hand winding of the meter magnet 29 is also included in the circuit in multiple with the relays above mentioned. The switching relays 111 and 101 of the switches F and E, the cut-off winding 12 of the switch C and the right-hand winding of the meter magnet 29 all have a comparatively high resistance as compared with that of the relay 53 of the connector switch, so that the latter relay is not operatively energized over this circuit, and therefore maintains the connection between the secondary winding of the busy signaling machine Q' and the third-position contact point of the side switch wiper 48.

When the substation calling device is operated for the third digit 2, the circuit of the connector line relay 51 is broken twice. Since the relay 110 is slow acting it does not deënergize during the momentary interruptions of its circuit by the relay 51, so that each time the latter relay is deënergized a circuit is closed extending from ground $G^9$ through the spring 118 and its back contact, spring 119 and its front contact, relay 120, vertical magnet 44 and the side switch wiper 49 to the battery lead 80. The vertical magnet 44 receives two impulses over this circuit and operates to raise the switch wipers 41, 42 and 43 to a position opposite the second level of bank contacts. The relay 120, which is included in series with the vertical magnet, remains in its energized position during the entire time impulses are being transmitted through it and operates to close the circuit of the relay 122 and the private magnet 50. After the last impulse is delivered, the relay 120 opens the circuit of the private magnet 50, which, upon deënergizing, permits the side switch to advance from first to second position. The movement of the side switch wiper 49 from first to second position transfers the battery connection from the vertical magnet to the rotary magnet 45. The calling subscriber now operates his calling device for the last digit 0, in response to which the connector line relay 51 operates to transmit ten impulses through the rotary magnet 45, in series with the relay 120, whereby the shaft wipers are rotated onto the contacts of the desired line. The relay 120 operates in response to this operation in the same manner as for the previous digit to cause the private magnet 50 to advance the side switch one more position—that is, from second to third position after the last impulse for the digit is transmitted. By the engagement of the side switch wipers 46 and 47 with their third-position contact points, and by the deënergization of the relay 122, the line connection is finally completed with the called substation, as shown by the heavy conductors. The relay 122 controls the contacts in the line circuit and is made slow acting, so as to prevent the completion of the line connection until after the cut-off winding 123 of the switch C' has had time to operate the armature 123ª to disconnect the switch from the line. The circuit of the winding 123 is closed by the engagement of the connector side switch wiper 48 with its third-position contact point, said circuit extending from ground $G^{10}$ through the secondary winding of the busy machine Q', back contact of the spring 54, side switch wiper 48, private wiper 43, back contact of the spring 124 and the winding 123 to the battery lead 80. The connection of the ground $G^{10}$ with the connector private bank contacts of the called line over the portion of the circuit just traced provides said contacts with a guarding potential to prevent the busy line from being seized by some othe. connector switch. By the engagement of the side switch wiper 49 with its third-position contact point, the circuit of the ringing relay 253 is closed, which circuit extends from ground $G^{11}$ through the interrupter 125, relay 253, springs 126 and the side switch wiper 49 to the battery lead 80. The ringing relay 253, upon energizing, disconnects the calling line from the called line and bridges the ringing current generator 127 across the called line to signal the called subscriber. The ringing relay is energized only intermittently through the medium of the interrupter 125. Upon the response of the called subscriber his line is provided with talking current through the windings of the back-bridge relay 52 of the connector switch, which relay, upon energizing, closes the circuit of the ringing cut-out relay 128, said circuit extending from the battery lead 80 through the side switch wiper 49, relay 128, springs 129 and 130 and the shaft-controlled contact 131 to ground $G^{12}$. The relay 128, upon energizing, interrupts the circuit of the ringing relay 253 at the springs 126 and closes a locking circuit for itself through its own springs 132, independent of the springs of the back-bridge relay 52. A further result of the energization of the relay 52 upon the response of the called subscriber is the transposition of the connections between the windings of the line relay 51 and trunk conductors 107 and 108, whereby the direction of current in the calling line is reversed. This reversal of the current in the left-hand winding of the subscriber's meter relay 29 (Fig. 2) causes the two windings to assist one another and the armature is attracted to operate the meter to register the call.

After the conversation is completed the connection is released by the hanging up of the receiver at the calling substation in the following manner: When the receiver at the substation A is restored to the switch hook, the separation of the hook switch springs 73 and 74 destroys the energizing circuit of the connector line relay 51 (Fig. 3). The relay 51 thereupon deënergizes and opens the circuit of the relay 110. The relay 110, upon deënergizing, opens the holding circuits of the relays 111, 101 and 12 of the switches F, E and C, respectively, at the springs 112 and also closes the circuit of the connector release magnet 250. The latter circuit extends from ground G⁵ through the spring 118 and its back contact, spring 119 and its back contact, shaft-controlled contact 180 and the magnet 250 to the battery lead 80. The magnet 250, upon energizing, restores the connector switch shaft and side switch to normal position, and its own circuit is interrupted at the contact 180 when the shaft reaches its lowest position. The deënergization of the relays 101 and 111 of the switches E and F serves to close the circuits of their respective release magnets 36 and 181. The circuit for the magnet 36 of the switch E extends from ground G⁵ through the springs 88, 89, 90, 91, spring 92 and its back contact, shaft contact 38 and the magnet 36 to the battery lead 80. The circuit of the magnet 181 is similar to that of the magnet 36. The circuits of the magnets 36 and 181 are broken when the switch shafts reach their normal positions. The deënergization of the winding 12 of the switch C permits the plunger arm 9 and the armature 13 to restore to normal position.

From the above description it is evident how connections are established and released in the automatic exchange.

Figure 4:
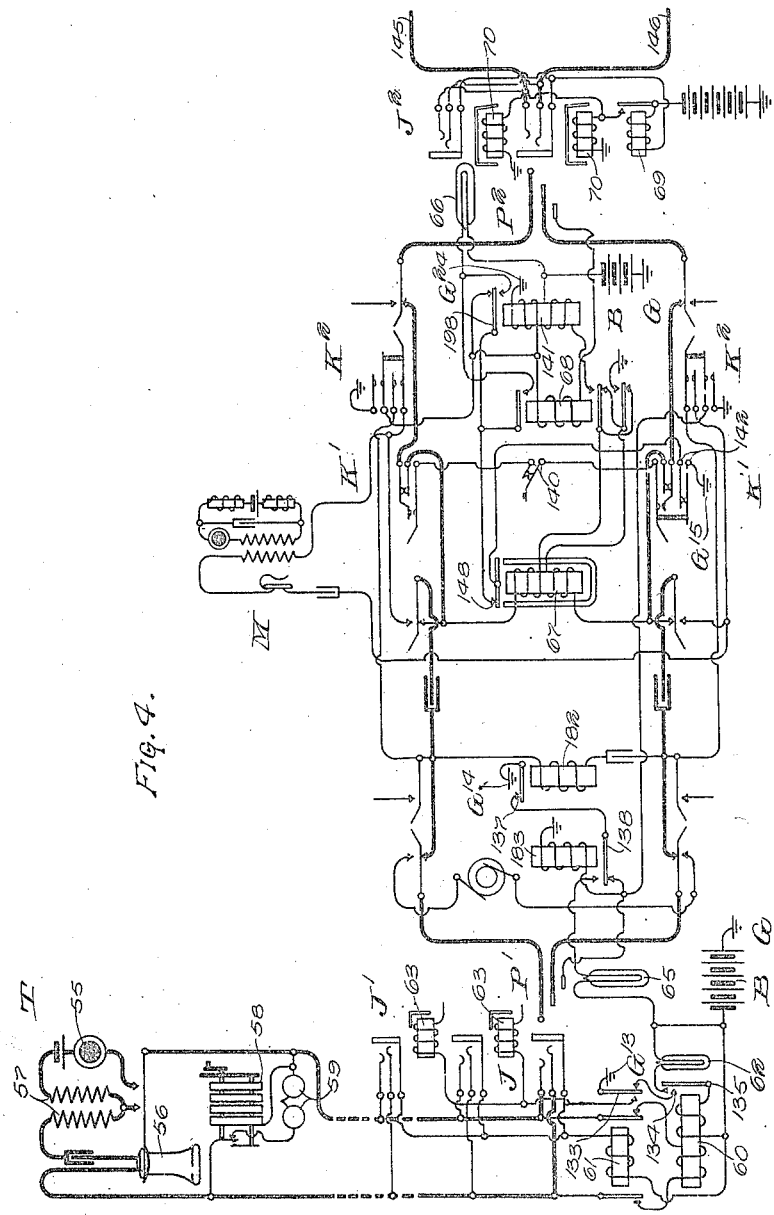
Fig. 4 shows a manual telephone line and operator's cord circuit.
Figure 5:
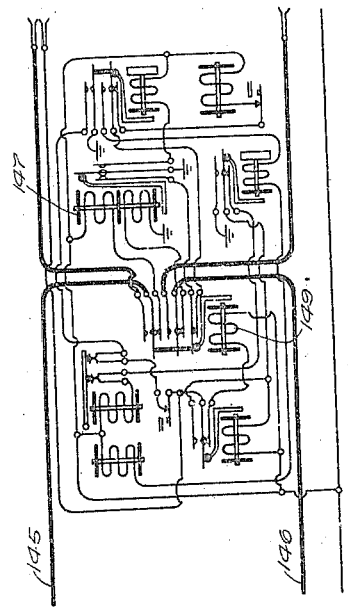
Fig. 5 shows a selector switch circuit for use with the operator's circuit.

It will now be explained how an operator may establish a connection between the manual telephone T (Fig. 4) and the automatic substation A' (Fig. 3). The subscriber at the telephone T signals the operator in the usual manner by operating the magneto 58, whereby the line relay 60 becomes energized and is locked in its operated position to close the circuit of the lamp 62. The locking circuit for the relay 60 extends from ground G¹³ through the back contact of the armature 133, contact point 134, armature 135 and the right-hand winding of the relay 60 to the battery B. The operator answers the call by inserting the plug P' into the jack J, whereby the calling line is connected with the cord circuit and a circuit is closed from ground G¹⁴ through the contact 137, armature 138 and its back contact, sleeve of the plug P' and the jack J and cut-off relay 61 to the battery B. The relay 61, upon energizing, disconnects the line relay from the line, breaks the holding circuit of the line relay and closes the circuit of the busy signals 63. Upon learning the number of the desired subscriber, the operator inserts the plug P² into a multiple jack J² of an idle trunk line leading to a selector switch I in the automatic exchange, and operates the key K' to connect a calling device similar to that at the automatic subscriber's substation with the trunk. In Fig. 4 the calling device is represented diagrammatically by a pair of impulse springs 140. By the engagement of the sleeve conductors of the plug P² and the jack J², a circuit is closed from ground G²⁴ in the cord circuit through the upper winding of the relay 141, relay 68, plug P², jack J² and the relay 69 to the battery B. The relay 69 has a sufficiently high resistance to prevent sufficient current from flowing over this circuit to energize the relay 68, but it is itself energized, as well as the relay 141. The relay 141 prepares the circuit for the lamp 66, which circuit, however, is still open at the springs 142 of the key K'. The relay 69, upon energizing, closes the circuit of the busy signals 70. The connection of the cord circuit with the selector I over the trunk conductors 145 and 146 causes the line relay 147 of said selector to energize in the same manner in which the line relay of the selector E (Fig. 2) was energized when the connection was first extended to it from the calling substation. The operator now operates her calling device in accordance with the respective digits of the number called for. The selector I operates in response to the operation of the calling device for the first digit in the same manner as explained for the selector E (Fig. 2) to extend the connection to a second selector similar to the selector F (Fig. 2). This second selector operates in response to the impulses for the second digit to extend the connection to a connector switch, which in turn operates in response to the last two digits to complete the connection with the called line in exactly the same manner as when said switches are operated by an automatic subscriber, as hereinabove explained. After the operator at the cord M has completed the operation of the calling device, the key K' is restored to normal position, whereby the calling device is disconnected from the line and the polarized relay 67 is bridged across the talking circuit instead. The current which flows through the relay 67 at this time is in the proper direction to maintain the contact 148 closed, whereby the circuit of the lamp 66 is completed, said circuit extending from ground G¹⁵ through the springs 142 of the key K', contact 148, armature 198 and its front contact and the lamp 66 to the battery B. Upon the response of the called subscriber, the current in the polarized relay 67 of the cord circuit is reversed in the same manner in which the current in the automatic substation A was reversed. This reversal of current causes the relay 67 to open the contact 148, whereby the lamp 66 is extinguished to signify that the called subscriber has answered. It will be remembered that in the connection described between the automatic substation A and the automatic substation A', the holding circuits for the relays 111 and 101 of the selectors F and E were completed through the relay 53 of the connector switch. In the same manner the holding circuit of the relay 149 of the selector I (Fig. 5) is completed through the relay 53 of the connector when the operator makes a call. The relay 149 of the selector I has a low resistance as compared with the corresponding relays of the switches F and E, so that when the relay 149 is included in the circuit of the relay 53 of the connector, the latter relay is operatively energized and disconnects the busy signaling machine Q' from the third-position contact point of the side switch wiper 48 and substitutes therefor the busy signaling machine $Q^2$. In other words, whenever an operator calls an automatic line, the connector private bank contacts of said line are provided with their guarding potentials from ground $G^{16}$ through the secondary winding of the busy machine $Q^2$ instead of from ground $G^{16}$ through the busy signaling machine Q'.

Upon the termination of the conversation the operator is given the usual answering and calling disconnect signals in the following manner: The calling subscriber, after hanging up his receiver, operates the magneto 58, whereby the relay 182 in the cord M is energized momentarily to open the short-circuit of the relay 183 at the contact 137. The relay 183 thereupon becomes energized in series with the cut-off relay 61 and opens a second point in its own short-circuit at the back contact of the armature 138 and closes the circuit of the lamp 65 at the front contact of said armature. When the called subscriber hangs up his receiver, the connector back-bridge relay 52 (Fig. 3) deënergizes, whereby the current in the polarized relay 67 of the cord M is restored to its normal position, causing said relay to close the contact 148 and again light the lamp 66. The operator now removes the plugs P' and $P^2$ from the jacks, and upon the removal of the plug $P^2$ from the jack $J^2$ the automatic part of the connection is released in the same manner in which the connection between the substations A and A' was released when the receiver at the substation A was hung up.

Having explained how connections may be completed with an automatic line either by an automatic subscriber or by the operator, it will now be explained how connection is prevented from being made with a busy line and how the operator is given a distinctive busy signal to indicate whether the busy line is involved in a local connection or has been called by an operator from the manual switchboard. From the foregoing description it is evident that whenever an automatic line is in use, its connector private bank contacts are provided with a guarding potential through the secondary winding of a busy signaling transformer. For example the guarding potential for calling lines is supplied from ground G' (Fig. 2) through the winding 86, while the guarding potential for called lines is supplied either from ground $G^{16}$ (Fig. 3) through the secondary winding of the machine Q', or from ground $G^{16}$ through the secondary winding of the machine $Q^2$, depending upon whether the line has been called by an automatic subscriber or by an operator. Assume now that the connector 11 (Fig. 3) attempts to connect with a busy line. When the slow acting relay 120 of the connector deënergizes after the last impulse for the last digit is delivered, the private magnet 50 and the relay 122 do not deënergize to complete the connection with the called line if said line is busy, but this magnet and relay remain energized over a circuit extending from the guarded private bank contact of the called line through the shaft wiper 43, side switch wiper 48 (in second position), springs 150 and 151, relay 152, springs 154 and 153 and the relay 122 and magnet 50 to battery. Since the relay 122 and magnet 50 do not deënergize, the side switch remains locked in second position and the connection between the calling and the called lines is maintained open at the side switch wipers 46 and 47, as well as at the springs of the relay 122. The relay 152 being included in the locking circuit of the private magnet energizes and transfers the said locking circuit from the grounded private bank contact to ground $G^{12}$ through the springs 151 and 155 and the shaft-controlled contact 131. Upon the closure of the contact between the springs 156 and 157 by the relay 152, a connection is extended from the lower side of the talking circuit through the side switch wiper 47 (in second position), springs 157 and 156, side switch wiper 48 (in second position), private wiper 43 and thence to the busy signaling machine Q, Q' or $Q^2$, depending upon which of these machines is connected to the private contacts of the busy line. A circuit from the busy signaling machine is therefore completed from ground through the secondary winding of the connected busy signaling machine to the connector private bank contacts of the busy line, thence through the private wiper 43 of the connector switch which has been used by the operator, through the side switch wiper 48 (in second position), springs 156 and 157, side switch wiper 47, condenser 158, thence over the heavy conductors to the calling line and back over the other side of the line, through the upper winding of the connector line relay 51 to the battery lead 80 and thence to the battery B and ground G back to the busy signaling machine. A busy signal is thus given to the calling subscriber.

In order for the operator to determine whether or not the called line is busy, she operates her key $K^2$ (Fig. 4) to connect her talking set with the line after the connection has been completed, whereby a path for the busy signal current is furnished through the operator's receiver. If the busy line is a calling line, the operator will hear the busy signal produced by the machine Q (Fig. 2). If it is a line which has been called by an automatic subscriber, the busy signal heard will be that of the machine Q' (Fig. 3), while if the line has been called by an operator, the busy signal will be that produced by the machine $Q^2$. The operator, upon noting the characteristics of the different busy signals, is enabled to tell in what kind of a connection the called line is engaged. If the signal from the machine $Q^2$ is heard, the operator knows that the line called for is busy in another connection from the manual switchboard, through which the long distance calls are completed, while if the signal from the machine Q' or Q is heard, she knows that the line called for is involved in a local connection. If it is desired to distinguish between calling and called lines, the two machines Q and Q' may be arranged to produce signals of different characters, while if it is not so desired, the machines Q and Q' may give the same kind of a signal, or a single machine may be used to produce the busy signal for both calling and called lines in local connections.

If it is found that the line is busy in a toll or semi-automatic connection, the operator informs the calling subscriber that the line is busy. If, however, it is found that the line is busy in a local connection, the operator then inserts the plug $P^2$ into a jack $J^4$ (Fig. 6) leading to a connector N, which has access to the particular group of lines in which the busy called subscriber is located, and calls him again over this connector to inform him that she has a toll or semi-automatic call waiting. The operations of the connector N, in so far as finding the called line is concerned, are the same as those of the connector H (Fig. 3), and it is therefore unnecessary to repeat a description of these operations. When, however, the wipers engage the contact of said line, the operation is somewhat different. Upon the engagement of the private wiper 160 with the contacts of the called line, which is assumed to be busy, a circuit is closed from said contact through the wiper 160, side switch wiper 161 (in second position) and the relay 162 to the battery lead 163. The relay 162, upon energizing, extends a connection from ground $G^{19}$ through the springs 164 and 165 and the relay 166 to the spring 167 of the private magnet relay 168. When this relay deenergizes after the last impulse for the last digit is delivered, the above circuit is continued through the spring 169 and private magnet 170 to the battery lead 163, thereby locking the private magnet 170 in its energized position to prevent the side switch from passing to third position, while at the same time the relay 166 is energized. The relay 166 corresponds in its operation to the relay 152 of the connector H (Fig. 3), but has a somewhat different function. The relay 166, upon energizing, does not connect a busy signal relay with a calling line, as does the relay 152, nor does it shift the holding circuit from the private magnet away from the circuit controlled by the private wiper 160, but it does, by the closure of the contact between the springs 171 and 172 and 173 and 174, complete connection between the calling and called lines by way of the second-position contact points of the side switch wipers 175 and 176. It will thus be seen that, although the side switch is locked in second position, the operator may talk to the busy called subscriber. If, after the operator has obtained this connection, the original connection in which the subscriber is involved is released, the ground will be removed from the private wiper 160. The relay 162 thereupon deënergizes and destroys the holding circuit of the private magnet 170, which thereupon deënergizes and permits the side switch to pass to third position, thereby completing the connection with the called line through the third-position contact point of the wipers 175 and 176 in the usual manner, and also completing the circuit of the ringing relay 177 at the side switch wiper 178. Ringing current will thereupon be applied to the called line and the subscriber will be signaled in the usual manner. It will be seen that the locking circuit for the private magnet is controlled through the medium of the slow acting relay 162 instead of directly from the private wiper, as is the case in the connector H (Fig. 3). This is to prevent the side switch of the connector H from passing to third position immediately upon the removal of the ground from the private wiper 160, so as to give the former connection sufficient time to be completely released before the side switch wiper 161 reaches third position and connects ground $G^{20}$ with the contacts of the called line. If the local connection had been released before the connector N had found the line, its side switch would have immediately passed to third position in the usual manner. After the connector N has begun to signal the called subscriber, the ringing current is cut off upon the removal of his receiver in the usual manner—that is, the back-bridge relay $178^a$, upon energizing, causes the ringing cut-out relay 179 to be energized.

After getting into communication with the desired subscriber through the medium of the connector N, the operator then informs him that she has a call for him from the manual or long distance line and can then either let the two subscribers talk through this connector, or can request the called subscriber to hang up his receiver and she can then call him again through one of the regular connections. This latter mode of operation is advisable in that the special connector N does not remain in use during the conversation, but is always in condition for use in calling a busy line.

The connector switch H' (Fig. 7) is a modification of a connector switch for accomplishing the same results as the connector H (Fig. 3). The connector H' is very similar to the connector H, with the addition of the relay 190. The relay 191 of the connector H' corresponds to the relay 53 of the connector H. Instead of controlling the connection of busy signaling machines with the third-position contact point 193 of the side switch wiper 192, however, the relay 191 controls a short-circuit around a resistance 194, through which said contact point is permanently grounded. Since the relay 191 operates in a manner similar to the relay 53 (Fig. 3), it is evident that when one automatic subscriber is called by another automatic subscriber through the connector H', the relay 191 will not be energized and the private bank contacts of the called line will be grounded direct without any interposed resistance, since the resistance 194 is short-circuited by the springs 195 and 196. When, however, an automatic line is called by the operator, the relay 191 is energized and the resistance 194 is therefore inserted in the ground connection of the connector private bank contacts of the called line. The relay 190 controls the connection between the spring 197 of the busy test relay 198 and the busy signaling machines Q³ and Q⁴, which correspond to the machines Q' and Q² (Fig. 3). Normally this spring 197 is connected through the spring 216 to the machine Q⁴, but when the relay 190 is energized, the spring 216 is shifted into contact with the spring 215 and the machine Q³ is thus connected with the spring 197. The lower winding of the relay 190 is included in the connection between the spring 199 and the second-position contact point 200 of the side switch wiper 192, while the upper winding of said relay 190 is included in the connection between the spring 201 and the shaft-controlled contact 202, but is normally short-circuited through its own springs 203 and 204. With this arrangement, it will be seen that the lower winding of the relay 190 is included in the original energizing circuit of the relay 198 when the relay 205 deënergizes after the last digit of a busy number has been called. This circuit extends from the grounded private bank contact of the called line through the private wiper 206, side switch wiper 192, contact 200, lower winding of the relay 190, springs 199 and 207, relay 198, springs 217 and 218, relay 210 and the private magnet 211 to the battery B. If the connector private bank contacts of the called line are connected to ground direct, the relay 190 is energized over this circuit and connects the busy signaling machine Q³ with the calling line through its springs 215 and 216 and the springs 197 and 208 of the relay 198, and at the same time removes the short-circuit from around its own upper winding by separating the springs 203 and 204. The upper winding of said relay is therefore included in the locking circuit of the relay 198, which circuit may be traced from ground G²⁶ through the shaft-controlled contact 202, upper winding of the relay 190, springs 201 and 207 and thence through the relays 198, 210 and magnet 211, as previously traced. If, however, the private bank contacts of the called line are grounded through a resistance similar to the resistance 194, sufficient current does not flow through the lower winding of the relay 190 when the relay 205 deënergizes to close the circuit of the relay 198. Since this relay is not energized by this initial circuit, the short-circuit is not removed from its upper winding, so that it is not included in the locking of the relay 198, and the busy signaling machine Q⁴ therefore remains connected through the spring 197 and the busy signal is furnished by this machine. It is thus seen that the connector H' is adapted to send back a discriminating busy signal to the calling lines without requiring the busy tone current to be connected to the connector private bank contacts of the called line, as is the case with the connector H (Fig. 3). When a subscriber endeavors to obtain connection with the telephone of a calling subscriber, the busy tone is of the same character as that sent over the line when the desired subscriber is being called by another automatic subscriber, i. e., the tone from the machine Q³. This is accomplished in the following manner: When the connectors H' are employed in the system, the spring contacts 24, 25 and 26 (Fig. 2) may be omitted from the subscribers' individual switches and the conductor 23 may be connected directly to the line switch bank spring 16. The connector private bank contacts of the calling lines will, therefore, be guarded by the same ground that supplies the holding circuits for the selector switches—that is, they will be grounded through the relay 191 (Fig. 7). Since the resistance of the relay 191 is negligible, the connector private bank contacts of calling lines will in effect be grounded direct, and when the connector H' attempts to make connection with a busy calling line, it will operate in exactly the same manner as when connection is attempted to be established with a called line which has been called by another automatic subscriber.

It will thus be seen that I have devised a very efficient system in which the operator can ascertain whether or not the busy called subscriber is involved in a toll connection or in a local connection. Furthermore, it will be seen that this differential busy test depends solely upon the manner in which the connection has been extended to the connector which first connected with the line, and is obtained even though the same kind of a connector is employed for attempting to establish connection with the called line while it is busy. If this connection has come by way of the automatic exchange, in which the regular selector switches are employed, one character of busy test is produced, while if this connection has come by way of the toll operator's board, in which a different form of selector is employed, a different character of busy test is obtained. While I have described this discriminating busy test as being employed in a system in which the toll calls come through a manual board and the local calls are established entirely by automatic means, it will, of course, be understood that the local calls could likewise come through a manual board, the only requirement being that in local calls a selector is used having a relay in the holding circuit of one resistance, while in the long distance calls a selector is employed having a release relay of a different resistance, to thereby bring about the marginal action of the connector relay.

Figure 6:
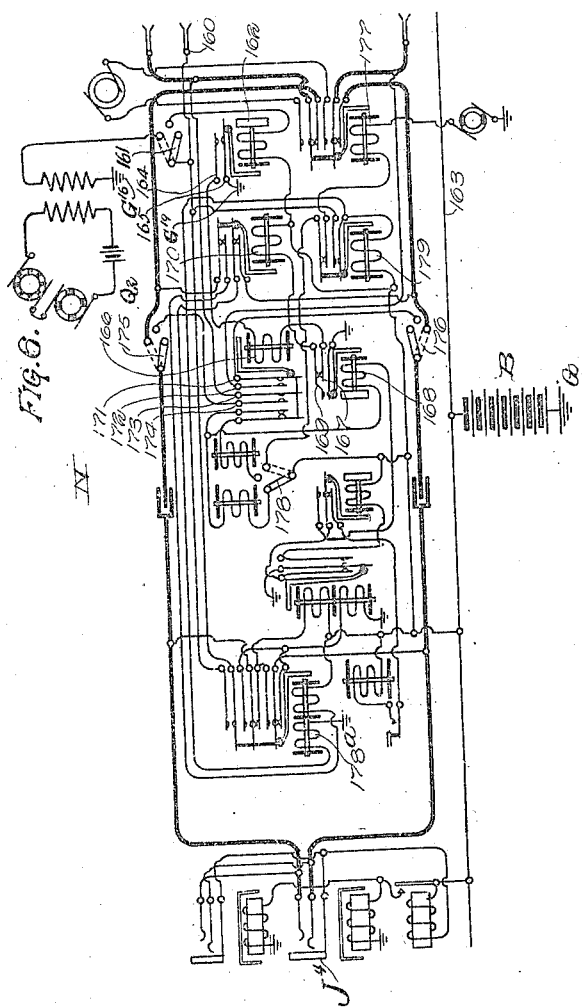
Fig. 6 shows diagrammatically a connector switch for connecting with a busy line.
Figure 7:
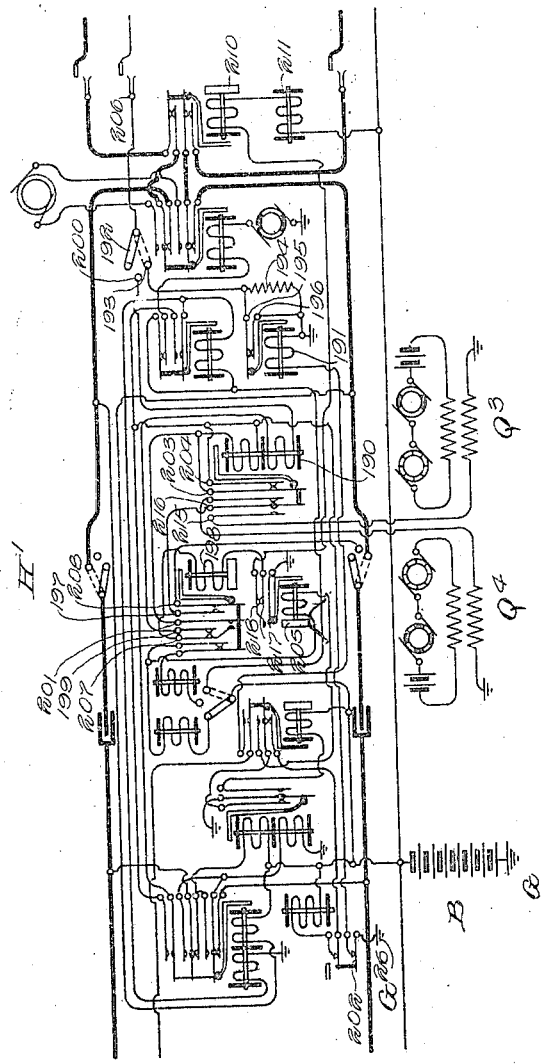
Fig. 7 is a modified form of connector switch.

Furthermore, in connection with the connector switch shown in Fig. 6, it will be seen that I have devised a very efficient switch for calling in on a busy line, which switch is provided with means for locking its side switch in second position and completing the talking connection while the side switch is in this second position. Also, if the subscriber hangs up so as to release his line while the operator is attempting to make connection through this form of connector switch, the side switch is then stepped to third position in the usual manner and the ringing current is sent over the called subscriber's line to call the subscriber back to his telephone.

From the foregoing it will be seen, therefore that one subscriber may call a second subscriber and apply a signal of one character to the called line. A third subscriber may call a fourth subscriber and apply a different signal to the line of the fourth subscriber. A fifth subscriber may initiate a call and apply a signal to his own line. These signals, of course, will all appear on the guarding circuits of these three lines, and will, therefore, appear at the connector private bank contacts of these lines, as for example, at private bank contacts of the connector H. Obviously therefore, an operator calling through the connector H may in succession call these three lines and obtain a different signal from each one, indicating to the operator three different characters of connection. From the foregoing it will also be seen that the connector N may be provided with multiples of the private contacts of three different lines and it will further be seen that connector N is of such a special character that if any one calling any one of these three lines via said connector while said line is busy remains on the line called until the original connection is terminated, the side switch of the connector N will pass to third position, applying a guarding potential to the line called and also a tone through the private wiper of the same character as that produced by the signaling machine $Q^2$.

While I have illustrated and described one particular embodiment of my invention, it will be understood, of course, that I do not wish to limit myself to the exact construction shown and described.

What I claim as my invention is:—

1. In a telephone system, a called line, a connector switch for seizing said line, a plurality of means for extending a connection to said connector switch, a second connector switch, and means for giving a discriminating busy test for indicating the means employed for extending the connection to said first connector switch when said first connector switch has seized said line and said second connector switch attempts to make connection therewith.

2. In a telephone system, a calling manual line, a calling automatic line, a called automatic line, an automatic connector switch for seizing said called line, means for extending a connection from said manual line to said connector switch, means for extending a connection from said calling automatic line to said connector switch, means for operating said connector to seize said called line, and a discriminating busy test for indicating which line is connected with said connector switch.

3. In a telephone system, a plurality of calling lines, a called line, an automatic connector switch for seizing said called line, means for extending a connection from one of said calling lines to said connector switch, means for operating said connector to seize said called line, independent means for extending a connection from another of said calling lines to said switch, and a discriminating busy test for indicating the calling line with which said connector switch is connected when an attempt is made to connect with said busy called line.

4. In a telephone system, a pair of calling lines, a called line, an automatic connector switch, means including a selector switch for extending a connection from one of said calling lines to said connector switch, means including another selector switch for extending a connection from the second of said calling lines to said connector switch, means for operating said connector to seize said called line, and means for placing a discriminating busy test on the multiple contacts of said called line to indicate which of said calling lines is connected with said connector.

5. In a telephone system, a pair of calling lines, a called line, an automatic connector switch, means including a selector switch for extending a connection from one of said calling lines to said connector switch, means including another selector switch for extending a connection from the second of said calling lines to said connector switch, means for operating said connector to seize said called line, a pair of busy signaling machines, and means for connecting one or the other of said busy signaling machines with the multiple contacts of said called line, depending upon which of said calling lines is connected with said connector.

6. In a telephone system, two groups of calling lines, a called line, an automatic connector switch, means for extending a connection from the first group of said calling lines to said connector switch, means for extending a connection from said second group of calling lines to said connector switch, means for operating said connector to seize said called line, a pair of busy signaling machines, a second connector switch, means whereby a busy signal from one of said busy signaling machines is transmitted through said second connector switch when it attempts to make connection with the busy called line when connection has been established with said first connector switch from one of said groups of lines, and means for transmitting a busy signal from the other of said busy machines when said connection has been established from the other of said groups of lines.

7. In a telephone system, a calling manual line, a calling automatic line, a called automatic line, an automatic connector switch, means including a manual operator's cord circuit for extending a connection from said manual line to said connector switch, means including a plurality of automatic switches for extending a connection from said calling automatic line to said connector switch, means for operating said connector to seize said called line, and a discriminating busy test for indicating which means is employed for connecting to said connector switch when an attempt is made to establish connection with said busy called line.

8. In a telephone system, a plurality of subscribers' lines, means for establishing a connection between two of said lines, means for giving one character of busy test when an attempt is made to establish connection with a called line involved in a previous connection, and means for giving a different character of busy test when an attempt is made to establish connection with a calling line in a previously established connection, said last means comprising a source of signaling current and comprising also a device for appropriating the same to the said calling line before it is called.

9. In a telephone system, manual lines, automatic lines, means for establishing connection between any two of said lines, and means for giving a discriminating busy test when an attempt is made to connect with a line already in use to indicate whether said busy line is a calling or a called line in the established connection, said last means comprising a source of signaling current and comprising also a device for appropriating the same to the calling line when calling and before it is called.

10. In a telephone system, subscribers' lines provided with multiple terminals, means for calling said terminals, means for extending a connection from said lines, a busy current machine, and means for connecting said machine with said multiple terminals when said connection is extended, and before the line is called.

11. In a telephone system, a subscriber's line provided with multiple terminals, means for calling said terminals, trunk lines, a trunking switch for said subscriber's line for extending a connection over one of said trunks, a busy signaling machine, and means for connecting said busy signaling machine with said multiple terminals when said trunking switch is operated to connect with one of said trunks, and before the trunk is called.

12. In a telephone system, a subscriber's line, multiple terminals for said line, a non-numerical trunking switch individual to said line, trunk lines, means controlled by said subscriber in making a call to operate said switch to automatically select an idle one of said trunks, a busy signaling machine, and means controlled by the operation of said switch for connecting said busy signaling machine with said multiple terminals.

13. In a telephone system, a pair of calling lines, a called line, an automatic connector switch, means including a selector switch for extending a connection from one of said calling lines to said connector switch, means including another selector switch for extending a connection from the second of said calling lines to said connector switch, means for operating said connector to seize said called line, a busy signaling machine normally selected for use, a second busy signaling machine, a relay, means for energizing said relay when connection is established with said connector switch through said last-mentioned selector switch, and means controlled by the energization of said relay for shifting the connection to substitute the second for the first machine.

14. In a telephone system, two groups of lines, an automatic connector switch for connecting with the lines of one of said groups, means including a selector switch for extending a connection from a line of one of said groups to said connector, means including another selector for extending a connection from a line of the other of said groups to said connector, a marginal relay in said connector, a low resistance relay in one of said selectors and a high resistance relay in the other of said selectors, means for connecting the relay of one of said selectors in series with the connector relay when a connection is established from said selector to the connector, said connector relay being adapted to be operatively energized when connected in series with said low resistance relay, but not when connected in series with said high resistance relay, a pair of busy signaling machines, and means controlled by said connector relay for bringing one or the other of said machines into use.

15. In a telephone system, two groups of lines, an automatic connector switch for connecting with the lines of one of said groups, means including a selector switch for extending a connection from a line of one of said groups to said connector, means including another selector for extending a connection from a line of the other of said groups to said connector, a marginal relay in said connector, a low resistance release relay in one of said selectors and a high resistance release relay in the other of said selectors, means for connecting the release relay of one of said selectors in series with the connector relay when a connection is established from said selector to the connector, said connector relay being adapted to be operatively energized when connected in series with said low resistance release relay, but not when connected in series with said high resistance release relay, a pair of busy signaling machines, and means controlled by said connector relay for bringing one or the other of said machines into use.

16. In a telephone system, subscribers' lines divided into groups, a connector switch having a motion to select groups and a second motion to connect with a line in a selected group, a plurality of means for extending a connection to said connector switch, a second connector switch, and means for giving a discriminating busy test for indicating the means employed for extending a connection to said first connector switch when said second connector switch attempts to make connection with a busy line.

17. In a telephone system, manual lines, a plurality of groups of automatic lines, an automatic connector switch having a motion to select groups and a motion to connect with a line in a selected group, means for extending a connection from said manual lines to said connector switch, means for extending a connection from said automatic lines to said connector switch, and a discriminating busy test for indicating whether a manual or an automatic line is connected with said connector switch.

18. In a telephone system, a plurality of lines divided into groups, an automatic connector switch having a motion to select groups and a second motion to connect with a line in a selected group, means for extending a connection from one of said groups of lines to said connector switch, independent means for extending a connection from another of said groups of lines to said connector switch, and a discriminating busy test for indicating the group of the calling line which is connected with said connector switch.

19. In a telephone system, a plurality of groups of lines, an automatic connector switch having a motion to select groups and a second motion to find a line in a selected group, means including a selector switch for extending a connection from one of said groups of lines to said connector switch, means including another selector switch for extending a connection from a second of said groups of lines to said connector switch, and means for placing a discriminating busy test on the multiple contacts of the line with which said connector is connected to indicate in which of said groups the calling line belongs.

20. In a telephone system, a plurality of groups of lines, an automatic connector switch having a motion to select groups and a second motion to find a line in a selected group, means including a selector switch for extending a connection from one of said groups of lines to said connector switch, means including another selector switch for extending a connection from a second of said groups of lines to said connector switch, a pair of busy signaling machines, and means for connecting one or the other of said busy signaling machines with the multiple contacts of the line with which said connector is connected, depending upon in which of said groups the calling line belongs.

21. In a telephone system, a plurality of subscribers' lines divided into groups, an automatic connector switch having a motion to select groups and a second motion to find a line in a selected group, means for extending a connection from one of said groups of lines to said connector switch, means for extending a connection from another of said groups of lines to said connector switch, a pair of busy signaling machines, a second connector switch, means whereby a busy signal is transmitted through said second connector switch when an attempt is made to connect with a line connected to said first connector when a connection has been established with said first connector from one of said groups of lines, and means for transmitting a busy signal from the other of said busy signaling machines when said connection to said first connector has been established from the second of said groups of lines.

22. In a telephone system, a group of manual lines, a plurality of groups of automatic lines, an automatic connector switch having a motion to select groups and a second motion to find a line in a selected group, means including an operator's cord circuit for extending a connection from one of said manual lines to said connector switch, means including a plurality of automatic switches for extending a connection from one of said automatic lines to said connector switch, and a discriminating busy test for indicating which means is employed for extending the connection to said connector switch when an attempt is made to establish connection with a line to which said connector is connected.

23. In a telephone system, a plurality of subscribers' lines divided into groups, means including an automatic connector switch having a motion to select groups and a second motion to find a line in a selected group, means for giving one character of busy test when an attempt is made to establish connection with a called line involved in a previous connection, and means for giving a different character of busy test when an attempt is made to establish connection with a calling line in a previously established connection, said last means comprising a source of signaling current and comprising also a device for appropriating the same to the calling line when making a call and before it is called.

24. In a telephone system, a plurality of manual lines, a plurality of groups of automatic lines, means for establishing a connection from a manual to an automatic line, means for establishing connection between two of said automatic lines, said means including an automatic connector switch having a motion to select groups and a second motion to find a line in a selected group, and means for giving a discriminating busy test when an attempt is made to connect with a line already in use to indicate whether said busy line is a calling or a called line in the established connection, said last means comprising a source of signaling current and comprising also a device for appropriating the same to the calling line when making a call and before it is called.

25. In a telephone system, a plurality of groups of lines, an automatic connector switch having a motion to select groups and a second motion to find a line in a selected group, means including a selector switch for extending a connection from one of said groups of lines to said connector switch, means including another selector switch for extending a connection from a second of said groups of lines to said connector switch, a busy signaling machine normally selected for use, a second busy signaling machine, a relay, means for energizing said relay when connection is established with said connector switch through said last-mentioned selector switch, and means controlled by the energization of said relay for shifting the connection to substitute the second for the first machine.

26. In a telephone system, a plurality of groups of subscribers' lines, an automatic connector switch having a motion to select groups and a second motion to find a line in a selected group, means including a selector switch for extending a connection from a line of one of said groups to said connector, means including another selector for extending a connection from a line of the other of said groups to said connector, a marginal relay in said connector, a low resistance relay in one of said selectors and a high resistance relay in the other of said selectors, means for connecting the relay of one of said selectors in series with the connector relay when a connection is established from said selector to the connector, said connector relay being adapted to be operatively energized when connected in series with said low resistance relay, but not when connected in series with said high resistance relay, a pair of busy signaling machines, and means controlled by said connector relay for bringing one or the other of said machines into use.

27. In a telephone system, a plurality of groups of subscribers' lines, an automatic connector switch having a motion to select groups and a second motion to find a line in a selected group, means including a selector switch for extending a connection from a line of one of said groups to said connector, means including another selector for extending a connection from a line of the other of said groups to said connector, a marginal relay in said connector, a low resistance release relay in one of said selectors and a high resistance release relay in the other of said selectors, means for connecting the release relay of one of said selectors in series with the connector relay when a connection is established from said selector to said connector, said connector relay being adapted to be operatively energized when connected in series with said low resistance release relay, but not when connected in series with said high resistance release relay, a pair of busy signaling machines, and means controlled by said connector relay for bringing one or the other of said machines into use.

28. In a telephone system, a subscriber's line, a connector switch having line wipers, a trunk line extending to said connector, a normally open switch between said trunk and said line wipers, means for moving said wipers into contact with said line, means for then closing said normally open switch to complete the connection with the line when said line is idle, means for locking said wipers on said line and maintaining said switch open when said line is busy, and means for closing a circuit around said switch to thereby complete the connection from said trunk to the busy line.

29. In a telephone system, a plurality of subscribers' lines, means for establishing a connection between two of said lines, said means including a trunk line and a connector switch connected thereto, said connector including line wipers normally disconnected from said trunk, an operating magnet operatively connected with said trunk for moving said wipers to select a group, a second operating magnet normally disconnected from said trunk for moving said wipers to connect with a line in the selected group, a side switch having a plurality of operative positions for successively controlling the connection to said operating magnets and then closing the connection from said line wipers to said trunk, means for locking said wipers on a busy line and for maintaining said side switch in a position to maintain the connection through the same to said line wipers open, and means for closing a circuit around said switch to thereby complete the connection from said trunk to the busy line.

30. In a telephone system, a subscriber's line, a connector switch having line wipers, a trunk line extending to said connector, a normally open switch between said trunk and said line wipers, means for moving said wipers into contact with said line, means for then closing said normally open switch to complete the connection with the line when said line is idle, means for locking said wipers on said line and maintaining said switch open when said line is busy, a relay, means for energizing said relay when said wipers are moved into contact with a busy line, and means controlled by said relay for closing a circuit around said switch to thereby complete a connection from said trunk to the busy line.

31. In a telephone system, a plurality of subscribers' lines, means for establishing a connection between two of said lines, said means including a trunk line and a connector switch connected thereto, said connector including line wipers normally disconnected from said trunk, an operating magnet operatively connected with said trunk for moving said wipers to select a group, a second operating magnet normally disconnected from said trunk for moving said wipers to connect with a line in the selected group, a side switch having a plurality of operative positions for successively controlling the connection to said operating magnets and then closing the connection from said line wipers to said trunk, means for locking said wipers on a busy line and for maintaining said side switch in a position to maintain the connection through the same to said line wipers open, a relay, means for energizing said relay when said wipers are moved into contact with a busy line, and means controlled by said relay for closing a circuit around said said switch to thereby complete a connection from said trunk to the busy line.

32. In a telephone system, a plurality of subscribers' lines, means for establishing a connection between two of said lines, said means including a trunk line and a connector switch connected thereto, said connector including line wipers normally disconnected from said trunk, an operating magnet operatively connected with said trunk for moving said wipers to select a group, a second operating magnet normally disconnected from said trunk for moving said wipers to connect with a line in the selected group, a side switch having a plurality of operative positions for successively controlling the connection to said operating magnets and then closing the connection from said line wipers to said trunk, means for locking said wipers on a busy line and for maintaining said side switch in a position to maintain the connection through the same to said line wipers open, a slow acting relay, means for energizing said relay when said wipers are brought into contact with a busy line, a second relay controlled by said slow acting relay, and means controlled by said second relay for closing a circuit around said switch to thereby complete a connection from said trunk to the busy line.

33. In a telephone system, a plurality of subscribers' lines, means for establishing a connection between two of said lines, means for giving one character of busy test when an attempt is made to establish connection with a called line involved in a previous connection, means for giving a different character of busy test when an attempt is made to establish connection with a calling line in a previously established connection, said last means comprising a source of signaling current and a circuit individual to said calling line and comprising also a device for bringing the two into operative relation before the said calling line is called.

34. In a telephone system, a plurality of subscribers' lines, means for establishing a connection between two of said lines, means for giving one character of busy test when an attempt is made to establish connection with a called line involved in a previous connection, means for giving a different character of busy test when an attempt is made to establish connection with a calling line in a previously established connection, said last means comprising a source of variable signaling current and a circuit individual to said calling line and comprising also a magnet individual to the line for bringing said current into use.

35. In a telephone system, a pair of calling lines, a called line, an automatic connector switch comprising a progressively movable device, means including a selector switch for extending a connection from one of said calling lines to said connector switch, means including another selector switch for extending a connection from the second of said calling lines to said connector switch, means for operating said connector to seize said called line, a busy signaling machine connected for use with the progressively movable device of the connector, a second busy signaling machine disconnected from said device, a relay, means for energizing said relay when connection is established with said connector switch through the last mentioned selector switch, and means controlled by the energization of said relay for shifting the connection of said movable device from said first busy machine to said second busy machine.

36. In a telephone system, a plurality of groups of lines, an automatic connector switch having a progressively movable device having motion in one plane to select groups and motion in a plane at right-angles thereto to find a line in a selected group, means including a selector switch for extending a connection from one of said groups of lines to said connector switch, means including another selector switch for extending a connection from a second of said groups of lines to said connector switch, a busy signaling machine connected with the progressively movable device of the connector, a second busy signaling machine disconnected from said device, a relay, means for energizing said relay when connection is established with said connector switch through said last-mentioned selector switch, and means controlled by the energization of said relay for shifting the connection of said movable device from said first busy machine to said second busy machine.

37. In a telephone system, a calling line, a called line, means for connecting the two and for associating a busy signal with the called line, a second calling line and means for connecting the second calling line with the said called line and for associating a different busy signal with the said called line, a second called line and means for extending a connection from said first called line to said second called line, the first called line acting as a calling line, and means for associating still another busy signal with the said first called line.

38. In a telephone system, a calling line, a called line, a connector for connecting the two and for associating a busy signal with the called line, a second calling line and means for connecting the second calling line with the said called line and for associating a different busy signal with the said called line, a second called line and means for extending a connection from said first called line to said second called line, the first called line acting as a calling line, and means for associating still another busy signal with the said first called line.

39. In a telephone system, a calling line, a called line, a connector for connecting the two and for associating a busy signal with the called line, a second calling line and said connector for connecting the second calling line with the said called line and for associating a different busy signal with the said called line, a second called line and means for extending a connection from said first called line to said second called line, the called line acting as a calling line, and means for associating still another busy signal with the said first called line.

40. In a telephone system, a called line, means for establishing connection with said line via either one of two trunks, and means comprising a circuit for associating one busy signal with the called line when the connection is established via one trunk and for associating a different busy signal with the called line when the connection is established via the other trunk, said means comprising also a marginal magnet, and means for energizing said magnet over one of said trunks for varying the busy signal.

41. In a telephone system, a called line, means for establishing connection with said line via either one of two trunks and an automatic switch, and means comprising a circuit for associating one busy signal with the called line when the connection is established via one trunk and for associating a different busy signal with the called line when the connection is established via the other trunk, said means comprising also a magnet.

42. In a telephone system, a called line, means for establishing connection with said line via either one of two trunks and a connector switch, and means comprising equipment in said connector switch for associating one busy signal with the called line when the connection is established via one trunk and for associating a different busy signal with the called line when the connection is established via the other trunk, said means comprising also a magnet.

43. In a telephone system, a called line, a guarding circuit for said called line, means for establishing connection with said called line and for applying a guarding potential and a discriminating signal to said guarding circuit.

44. In a telephone system, a line, a guarding circuit for said line, means for establishing connection with said line, a plurality of discriminating signals, and means for associating either of said signals with said guarding circuit by establishing connection with said line.

45. In a telephone system, a line, a guarding circuit for said line, means for bringing said line into use, a plurality of signals and means for associating either one of said signals with said guarding circuit by bringing the line into use.

46. In a telephone system, a line, a guarding circuit for said line, means for establishing connection to or from said line, a signal, and means for associating said signal with said guarding circuit when connection is extended to the line, another signal, and means for associating said second signal with said guarding circuit when connection is extended from the line.

47. In a telephone system, a line, a guarding circuit for said line, means for establishing connection to or from said line, a signaling apparatus, and means for connecting said signaling apparatus with said guarding circuit when connection is made to or from the line.

48. In a telephone system, a line, means for bringing said line into use, a signal for said line, a second line, means for bringing said line into use, a signal for said second line, a third line, means for bringing said line into use and a signal for said third line, means for establishing connection with either of said lines and with either of said signals.

49. In a telephone system, a calling line, a called line, a progressively movable automatic switch for connecting the two and for associating a busy signal with the called line, a second calling line and means for connecting the second calling line with the said called line and for associating a different busy signal with the said called line, a second called line and means for extending a connection from said first called line to said second called line, the first called line acting as a calling line, and means for associating still another busy signal with the said first called line.

50. In a telephone system, a calling line, a called line, means for connecting the two and for associating a busy signal with the called line, a second calling line and a progressively movable automatic switch for connecting the second calling line with the said called line and for associating a different busy signal with the said called line, a second called line and means for extending a connection from said first called line to said second called line, the first called line acting as a calling line, and means for associating still another busy signal with the said first called line.

51. In a telephone system, a calling line, a called line, means for connecting the two and for associating a busy signal with the called line, a second calling line and means for connecting the second calling line with the said called line and for associating a different busy signal with the said called line, a second called line and a progressively movable automatic switch for extending a connection from said first called line to said second called line, and for associating still another busy signal with the said first called line, the said first called line acting as a calling line.

52. In a telephone system, a calling line, a called line, a progressively movable automatic switch for connecting the two and for associating a busy signal with the called line, a second calling line and a progressively movable automatic switch for connecting the second calling line with the said called line and for associating a different busy signal with the said called line, a second called line and a progressively movable automatic switch for extending a connection from said first called line to said second called line, and for associating still another busy signal with the said first called line, the said first called line acting as a calling line.

53. In a telephone system, a calling line, a called line, means for connecting the two and for associating a busy signal with the called line, a second calling line and a connector switch for connecting the second calling line with the said called line and for associating a different busy signal with the said called line, a second called line and means for extending a connection from said first called line to said second called line, the first called line acting as a calling line, and means for associating still another busy signal with the said first called line.

54. In a telephone system, a calling line, a called line, means for connecting the two and for associating a busy signal with the called line, a second calling line and means for connecting the second calling line with the said called line and for associating a different busy signal with the said called line, a second called line and an individual switch for said first called line for extending a connection therefrom to said second called line, and for associating still another busy signal with said first called line.

55. In a telephone system, a calling line, a called line, means for connecting the two and for associating a busy signal with the called line, a second calling line and a connector switch for connecting the second calling line with the said called line and for associating a different busy signal with the said called line, a second called line and an individual switch for said first called line for extending a connection therefrom to said second called line, and for associating still another busy signal with said first called line.

56. In a telephone system, a calling line, a called line, a connector for connecting the two and for associating a busy signal with the called line, a second calling line and said connector for connecting the second calling line with the said called line and for associating a different busy signal with the said called line, a second called line and an individual switch for said first called line for extending a connection therefrom to said second called line, and for associating still another busy signal with the said first called line.

57. In a telephone system, a called line, progressively movable automatic switching apparatus for establishing connection with said line via either one of two paths, and means comprising a circuit for associating one busy signal with the called line when the connection is established via one path and for associating a different busy signal with the called line when the connection is established via the other path, said means comprising also a magnet.

58. In a telephone system, a called line, means for establishing connection with said line via either one of two paths, and progressively movable automatic switching apparatus comprising a circuit for associating one busy signal with the called line when the connection is established via one path and for associating a different busy signal with the called line when the connection is established via the other path, said means comprising also a magnet.

59. In a telephone system, a called line, progressively movable automatic switching apparatus for establishing connection with said line via either one of two paths, said progressively movable automatic switching apparatus comprising a circuit for associating one busy signal with the called line when the connection is established via one path and for associating a different busy signal with the called line when the connection is established via the other path, said means comprising also a magnet.

60. In a telephone system, a called line, progressively movable automatic switching apparatus for establishing connection with said line via either one of two trunks, and means comprising a circuit for associating one busy signal with the called line when the connection is established via one trunk and for associating a different busy signal with the called line when the connection is established via the other trunk, said means comprising also a marginal magnet, and means for energizing said magnet over one of said trunks for varying the busy signal.

61. In a telephone system, a called line, means for establishing connection with said line via either one of two trunks, and progressively movable automatic switching apparatus comprising a circuit for associating one busy signal with the called line when the connection is established via one trunk and for associating a different busy signal with the called line when the connection is established via the other trunk, said means comprising also a marginal magnet, and means for energizing said magnet over one of said trunks for varying the busy signal.

62. In a telephone system, a called line, progressively movable automatic switching apparatus for establishing connection with said line via either one of two trunks, and progressively movable automatic switching apparatus comprising a circuit for associating one busy signal with the called line when the connection is established via one trunk and for associating a different busy signal with the called line when the connection is established via the other trunk, said means comprising also a marginal magnet, and means for energizing said magnet over one of said trunks for varying the busy signal.

63. In a telephone system, a called line, means comprising a connector switch for establishing connection with said line via either one of two paths, and means comprising a circuit for associating one busy signal with the called line when the connection is established via one path and for associating a different busy signal with the called line when the connection is established via the other path, said means comprising also a magnet.

64. In a telephone system, a called line, means comprising a connector switch for establishing connection with said line via either one of two paths, and means in said connector switch comprising a circuit for associating one busy signal with the called line when the connection is established via one path and for associating a different busy signal with the called line when the connection is established via the other path, said means comprising also a magnet.

65. In a telephone system, a called line, means comprising a connector switch for establishing connection with said line via either one of two paths, and means in said connector switch comprising a circuit for associating one busy signal with the called line when the connection is established via one path and for associating a different busy signal with the called line when the connection is established via the other path, said means comprising also a marginal magnet.

66. In a telephone system, a called line, means comprising a connector switch for establishing connection with said line via either one of two trunks, and means comprising a circuit for associating one busy signal with the called line when the connection is established via one trunk and for associating a different busy signal with the called line when the connection is established via the other trunk, said means comprising also a marginal magnet, and means for energizing said magnet over one of said trunks for varying the busy signal.

67. In a telephone system, a called line, means comprising a connector switch for establishing connection with said line via either one of two trunks, and means in said connector switch comprising a circuit for associating one busy signal with the called line when the connection is established via one trunk and for associating a different busy signal with the called line when the connection is established via the other trunk, said means comprising also a marginal magnet, and means for energizing said magnet over one of said trunks for varying the busy signal.

68. In a telephone system, a calling line, a called line, a progressively movable automatic switch for connecting the two and for associating a busy signal with the called line, a second calling line and means for connecting the second calling line with the said called line and for associating a different busy signal with the said called line, a second called line and means for extending a connection from said first called line to said second called line, the first called line acting as a calling line, and means for associating still another busy signal with the said first called line, and a guarding circuit for the first called line to which said signals are connected when associated with said line.

69. In a telephone system, a calling line, a called line, means for connecting the two and for associating a busy signal with the called line, a second calling line and a progressively movable automatic switch for connecting the second calling line with the said called line and for associating a different busy signal with the said called line, a second called line and means for extending a connection from said first called line to said second called line, the first called line acting as a calling line, means for associating still another busy signal with the said first called line, and a guarding circuit for the first called line to which said signals are connected when associated with said line.

70. In a telephone system, a calling line, a called line, means for connecting the two and for associating a busy signal with the called line, a second calling line and means for connecting the second calling line with the said called line and for associating a different busy signal with the said called line, a second called line and a progressively movable automatic switch for extending a connection from said first called line to said second called line, and for associating still another busy signal with the said first called line, the said first called line acting as a calling line, and a guarding circuit for the first called line to which said signals are connected when associated with said line.

71. In a telephone system, a calling line, a called line, a progressively movable automatic switch for connecting the two and for associating a busy signal with the called line, a second calling line and a progressively movable automatic switch for connecting the second calling line with the said called line and for associating a different busy signal with the said called line, a second called line and a progressively movable automatic switch for extending a connection from said first called line to said second called line, and for associating still another busy signal with the said first called line, the said first called line acting as a calling line, and a guarding circuit for the first called line to which said signals are connected when associated with said line.

72. In a telephone system, a calling line, a called line, means for connecting the two and for associating a busy signal with the called line, a second calling line and a connector switch for connecting the second calling line with the said called line and for associating a different busy signal with the said called line, a second called line and means for extending a connection from said first called line to said second called line, the first called line acting as a calling line, means for associating still another busy signal with the said first called line and a guarding circuit for the first called line to which said signals are connected when associated with said line.

73. In a telephone system, a calling line, a called line, means for connecting the two and for associating a busy signal with the called line, a second calling line and means for connecting the second calling line with the said called line and for associating a different busy signal with the said called line, a second calling line, an individual switch for said first called line for extending a connection to said second called line, and for associating still another busy signal with said first called line, and a guarding circuit for the first called line to which said signals are connected when associated with said line.

74. In a telephone system, a calling line, a called line, means for connecting the two and for associating a busy signal with the called line, a second calling line and a connector switch for connecting the second calling line with the said called line and for associating a different busy signal with the said called line, a second called line, an individual switch for said first called line for extending a connection to said second called line, and for associating still another busy signal with said first called line, and a guarding circuit for the first called line to which said signals are connected when associated with said line.

75. In a telephone system, a calling line, a called line, a connector for connecting the two and for associating a busy signal with the called line, a second calling line and said connector for connecting the second calling line with the said called line and for associating a different busy signal with the said called line, a second called line, an individual switch for said first called line for extending a connection to said second called line, and for associating still another busy signal with the said first called line, and a guarding circuit for the first called line to which said signals are connected when associated with said line.

76. In a telephone system, a called line, progressively movable automatic switching apparatus for establishing connection with said line via either one of two paths, means comprising a circuit for associating one busy signal with the called line when the connection is established via one path and for associating a different busy signal with the called line when the connection is established via the other path, said means comprising also a magnet, and a guarding circuit for the called line to which said signals are connected when associated with said line.

77. In a telephone system, a called line, means for establishing connection with said line via either one of two paths, progressively movable automatic switching apparatus comprising a circuit for associating one busy signal with the called line when the connection is established via one path and for associating a different busy signal with the called line when the connection is established via the other path, said means comprising also a magnet, and a guarding circuit for the called line to which said signals are connected when associated with said line.

78. In a telephone system, a called line, progressively movable automatic switching apparatus for establishing connection with said line via either one of two paths, said progressively movable automatic switching apparatus comprising a circuit for associating one busy signal with the called line when the connection is established via one path and for associating a different busy signal with the called line when the connection is established via the other path, said means comprising also a magnet, and a guarding circuit for the called line to which said signals are connected when associated with said line.

79. In a telephone system, a called line, progressively movable automatic switching apparatus for establishing connection with said line via either one of two trunks, and means comprising a circuit for associating one busy signal with the called line when the connection is established via one trunk and for associating a different busy signal with the called line when the connection is established via the other trunk, said means comprising also a marginal magnet, means for energizing said magnet over one of said trunks for varying the busy signal, and a guarding circuit for the called line to which said signals are connected when associated with said line.

80. In a telephone system, a called line, means for establishing connection with said line via either one of two trunks, and progressively movable automatic switching apparatus comprising a circuit for associating one busy signal with the called line when the connection is established via one trunk and for associating a different busy signal with the called line when the connection is established via the other trunk, said means comprising also a marginal magnet, means for energizing said magnet over one of said trunks for varying the busy signal, and a guarding circuit for the called line to which said signals are connected when associated with said line.

81. In a telephone system, a called line, progressively movable automatic switching apparatus for establishing connection with said line via either one of two trunks, said progressively movable automatic switching apparatus comprising a circuit for associating one busy signal with the called line when the connection is established via one trunk and for associating a different busy signal with the called line when the connection is established via the other trunk, said means comprising also a marginal magnet, means for energizing said magnet over one of said trunks for varying the busy signal, and a guarding circuit for the called line to which said signals are connected when associated with said line.

82. In a telephone system, a called line, means comprising a connector switch for establishing connection with said line via either one of two paths, means comprising a circuit for associating one busy signal with the called line when the connection is established via one path and for associating a different busy signal with the called line when the connection is established via the other path, said means comprising also a magnet, and a guarding circuit for the called line to which said signals are connected when associated with said line.

83. In a telephone system, a called line, means comprising a connector switch for establishing connection with said line via either one of two paths, means in said connector switch comprising a circuit for associating one busy signal with the called line when the connection is established via one path and for associating a different busy signal with the called line when the connection is established via the other path, said means comprising also a magnet, and a guarding circuit for the called line to which said signals are connected when associated with said line.

84. In a telephone system, a called line, means comprising a connector switch for establishing connection with said line via either one of two trunks, and means comprising a circuit for associating one busy signal with the called line when the connection is established via one trunk and for associating a different busy signal with the called line when the connection is established via the other trunk, said means comprising also a marginal magnet, means for energizing said magnet over one of said trunks for varying the busy signal, and a guarding circuit for the called line to which said signals are connected when associated with said line.

85. In a telephone system, a called line, means comprising a connector switch for establishing connection with said line via either one of two trunks, and means in said connector switch comprising a circuit for associating one busy signal with the called line when the connection is established via one trunk and for associating a different busy signal with the called line when the connection is established via the other trunk, said means comprising also a marginal magnet, means for energizing said magnet over one of said trunks for varying the busy signal, and a guarding circuit for the called line to which said signals are connected when associated with said line.

86. In a telephone system, a called line, a guarding circuit for said called line, a progressively movable automatic switch for establishing connection with said line and for supplying a guarding potential to said called circuit, a discriminating signal, and means for applying said discriminating signal to said called line.

87. In a telephone system, a called line, a guarding circuit for said called line, a connector switch for establishing connection with said line and for supplying a guarding potential to said called circuit, a discriminating signal, and means for applying said discriminating signal to said called line.

88. In a telephone system, a called line, a guarding circuit for said called line, means for establishing connection with said line and for supplying a guarding potential to said called circuit, a discriminating signal, and a magnet for applying said discriminating signal to said called line.

89. In a telephone system, a called line, a guarding circuit for said called line, means for establishing connection with said line and for supplying a guarding potential to said called circuit, a discriminating signal, and a marginal relay for applying said discriminating signal to said called line.

90. In a telephone system, a called line, a guarding circuit for said called line, a progressively movable automatic switch for establishing connection with said line and for supplying a guarding potential to said called circuit, a discriminating signal, and a magnet for applying said discriminating signal to said called line.

91. In a telephone system, a called line, a guarding circuit for said called line, a connector switch for establishing connection with said line and for supplying a guarding potential to said called circuit, a discriminating signal, and a marginal relay for applying said discriminating signal to said called line.

92. In a telephone system, a called line, a guarding circuit for said called line, a progressively movable automatic switch for establishing connection with said line and for supplying a guarding potential to said called circuit, a discriminating signal, and means for applying said discriminating signal to said called line simultaneously with said guarding potential.

93. In a telephone system, a called line, a guarding circuit for said called line, a connector switch for establishing connection with said line and for supplying a guarding potential to said called circuit, a discriminating signal, and means for applying said discriminating signal to said called line simultaneously with said guarding potential.

94. In a telephone system, a called line, a guarding circuit for said called line, means for establishing connection with said line and for supplying a guarding potential to said called circuit, a discriminating signal, and a magnet for applying said discriminating signal to said called line simultaneously with said guarding potential.

95. In a telephone system, a called line, a guarding circuit for said called line, means for establishing connection with said line and for supplying a guarding potential to said called circuit, a discriminating signal, and a marginal relay for applying said discriminating signal to said called line simultaneously with said guarding potential.

96. In a telephone system, a called line, a guarding circuit for said called line, a progressively movable automatic switch for establishing connection with said line and for supplying a guarding potential to said called circuit, a discriminating signal, and a magnet for applying said discriminating signal to said called line simultaneously with said guarding potential.

97. In a telephone system, a called line, a guarding circuit for said called line, a connector for establishing connection with said line and for supplying a guarding potential to said called circuit, a discriminating signal, and a marginal relay for applying said discriminating signal to said called line simultaneously with said guarding potential.

98. In a telephone system, a called line, a guarding circuit for said called line, a progressively movable automatic switch for establishing connection with said called line and for applying a guarding potential and a discriminating signal to said guarding circuit.

99. In a telephone system, a called line, a guarding circuit for said called line, a connector switch for establishing connection with said called line and for applying a guarding potential and a discriminating signal to said guarding circuit.

100. In a telephone system, a called line, a guarding circuit for said called line, means for establishing connection with said called line, said means comprising a magnet for applying a guarding potential and a discriminating signal to said guarding circuit.

101. In a telephone system, a called line, a guarding circuit for said called line, means for establishing connection with said called line, said means comprising a marginal relay for applying a guarding potential and a discriminating signal to said guarding circuit.

102. In a telephone system, a called line, a guarding circuit for said called line, a progressively movable automatic switch for establishing connection with said called line and comprising a magnet for applying a guarding potential and a discriminating signal to said guarding circuit.

103. In a telephone system, a called line, a guarding circuit for said called line, a connector switch for establishing connection with said called line and comprising a marginal relay for applying a guarding potential and a discriminating signal to said guarding circuit.

104. In a telephone system, a called line, a guarding circuit for said called line, means for establishing connection with said called line and for applying a guarding potential and a discriminating tone signal to said guarding circuit.

105. In a telephone system, a line, a guarding circuit for said line, progressively movable automatic switching apparatus for bringing said line into use, a plurality of signals and means for associating either one of said signals with said guarding circuit by bringing the line into use.

106. In a telephone system, a line, a guarding circuit for said line, means for bringing said line into use, a plurality of signals and means for connecting either one of said signals with said guarding circuit by bringing the line into use.

107. In a telephone system, a line, a guarding circuit for said line, progressively movable automatic switching apparatus for bringing said line into use, a plurality of signals and means in said apparatus for associating either one of said signals with said guarding circuit by bringing the line into use.

108. In a telephone system, a line, a guarding circuit for said line, a connector switch for bringing said line into use, a plurality of signals and means for associating either one of said signals with said guarding circuit by bringing the line into use.

109. In a telephone system, a line, a guarding circuit for said line, a connector switch for bringing said line into use, a plurality of signals and means in said connector switch for associating either one of said signals with said guarding circuit by bringing the line into use.

110. In a telephone system, a line, a guarding circuit for said line, progressively movable automatic switching apparatus for establishing connection to or from said line, a signal, and means for associating said signal with said guarding circuit when connection is extended to the line, another signal, and means for associating said second signal with said guarding circuit when connection is extended from the line.

111. In a telephone system, a line, a guarding circuit for said line, a signal, progressively movable automatic switching mechanism for establishing connection to or from said line and for associating said signal with said guarding circuit when connection is extended to the line, another signal, and means for associating said second signal with said guarding circuit when connection is extended from the line.

112. In a telephone system, a line, a signal, a guarding circuit for said line, a second signal, progressively movable automatic switching mechanism for establishing connection to or from said line and for associating said first signal with said guarding circuit when connection is extended to the line and for associating said second signal with said guarding circuit when connection is extended from the line.

113. In a telephone system, a line, a signal, a guarding potential circuit for said line, a second signal, progressively movable automatic switching mechanism for establishing connection to or from said line and for associating one of said signals with said guarding circuit when connection is extended from the line, and a magnet for associating the other one of said signals with said guarding circuit when connection is extended to the line.

114. In a telephone system, a line, a signal, a guarding potential circuit for said line, a second signal, progressively movable automatic switching mechanism for establishing connection to or from said line and for connecting one of said signals with said guarding circuit when connection is extended from the line, and a magnet for connecting the other one of said signals with said guarding circuit when connection is extended to the line.

115. In a telephone system, a line, a guarding circuit for said line, progressively movable automatic switching mechanism for establishing connection to or from said line, a signaling apparatus, and means for connecting said signaling apparatus with said guarding circuit when connection is made to or from the line.

116. In a telephone system, a line, a guarding circuit for said line, progressively movable automatic switching mechanism for establishing connection to or from said line, a signaling apparatus, and electromagnetic means for connecting said signaling apparatus with said guarding circuit when connection is made to or from the line.

117. In a telephone system, a line, progressively movable automatic switching mechanism for bringing said line into use, a signal for said line, a second line, progressively movable automatic switching mechanism for bringing said line into use, a signal for said second line, a third line, progressively movable automatic switching mechanism for bringing said line into use and a signal for said third line, means for applying said signals to said lines and means for then detecting said signals.

118. In a telephone system, a line, a guarding circuit for said line, a signal for said line normally disconnected from said circuit, and means for connecting said signal to said guarding circuit.

119. In a telephone system, a line, a guarding circuit for said line, a tone test for said line, automatic means for establishing connection with said guarding circuit and for connecting said busy tone to said guarding circuit.

120. In a telephone system, a line, a guarding circuit for said line, progressively movable automatic switching mechanism for establishing connection with said guarding circuit over one path and for connecting therewith means for producing a tone test, progressively movable automatic switching mechanism for connecting with said guarding circuit to produce the tone.

121. In a telephone system, a line, a guarding circuit for said line, a connector switch for establishing connection with said line, a second connector switch for establishing connection with said line, a bank for each of said switches, each bank having a line multiple terminal of said line via which connection with said line is established and having a multiple terminal of said guarding circuit, a private wiper for said first connector switch for connecting a guarding potential to said guarding circuit, a private wiper for said second connector for establishing connection with said guarding circuit, means for releasing the first switch and for removing the guarding potential from said guarding circuit, and automatic means in said second switch responsive to the removal of the guarding potential from said guarding circuit for causing a new guarding potential to be connected therewith via the private wiper of said second switch and for at the same time associating a tone test with said line.

122. In a telephone system, a line, a guarding circuit for said line, a connector switch for establishing connection with said line, a second connector switch for establishing connection with said line, a bank for each of said switches, each bank having a line multiple terminal of said line via which connection with said line is established and having a multiple terminal of said guarding circuit, a private wiper for said first connector switch for connecting a guarding potential and a tone test to said guarding circuit, a private wiper for said second connector for establishing connection with said guarding circuit, means for releasing the first switch and for removing the guarding potential from said guarding circuit, and automatic means in said second switch responsive to the removal of the guarding potential from said guarding circuit for causing a new guarding potential to be connected therewith via the private wiper of said second switch.

123. In a telephone system, a calling manual line, a calling automatic line, a called automatic line, a connector switch for seizing said called line, means for extending a connection from said manual line to said connector switch, means for extending a connection from said calling automatic line to said connector switch, means for operating said connector to seize said called line, and means in said connector switch for placing a guarding potential either direct from battery or from battery through a resistance for indicating which line is connected with said connector switch.

124. In a telephone system, a pair of calling lines, a called line, an automatic connector switch, means including a selector switch for extending a connection from one of said calling lines to said connector switch, means including another selector switch for extending a connection from the second of said calling lines to said connector switch, means for operating said connector to seize said called line, and means for placing a discriminating guarding potential on the multiple contacts of said called line to indicate which of said calling lines is connected with said connector.

125. In a telephone system, a pair of calling lines, a called line, an automatic connector switch, means including a selector switch for extending a connection from one of said calling lines to said connector switch, means including another selector switch for extending a connection from the second of said calling lines to said connector switch, means for operating said connector to seize said called line, two paths for applying a guarding potential to said called line, and means for connecting one or the other of said paths with the multiple contacts of said called line, depending upon which of said callling lines is connected with said connector.

126. In a telephone system, a pair of calling lines, a called line, an automatic connector switch, means including a selector switch for extending a connection from one of said calling lines to said connector switch, means including another selector switch for extending a connection from the second of said calling lines to said connector switch, means for operating said connector to seize said called line, a guarding potential circuit normally selected for use, a second guarding potential circuit, a relay, means for energizing said relay when connection is established with said connector switch through said last mentioned selector switch, and means controlled by the energization of said relay for shifting the connection to substitute the second for the first guarding potential circuit.

127. In a telephone system, two groups of lines, an automatic connector switch for connecting with the lines of one of said groups, means including a selector switch for extending a connection from a line of one of said groups to said connector, means including another selector for extending a connection from a line of the other of said groups to said connector, a marginal relay in said connector, a low resistance relay in one of said selectors and a high resistance relay in the other of said selectors, means for connecting the relay of one of said selectors in series with the connector relay when a connection is established from said selector to the connector, said connector relay being adapted to be operatively energized when connected in series with said low resistance relay, but not when connected in series with said high resistance relay, a pair of guarding potential circuits, and means controlled by said connector relay for bringing one or the other of said guarding potential circuits into use.

128. In a telephone system, a plurality of groups of lines, an automatic connector switch having a motion to select groups and a second motion to find a line in a selected group, means including a selector switch for extending a connection from one of said groups of lines to said connector switch, means including another selector switch for extending a connection from a second of said groups of lines to said connector switch, a guarding potential circuit normally selected for use, a second guarding potential circuit, a relay, means for energizing said relay when connection is established with said connector switch through said last mentioned selector switch, and means controlled by the energization of said relay for shifting the connection to substitute the second for the first guarding potential circuit.

129. In a telephone system, a plurality of groups of subscriber's lines, an automatic connector switch having a motion to select groups, and a second motion to find a line in a selected group, means including a selector switch for extending a connection from a line of one of said groups to said connector, means including another selector for extending a connection from a line of the other of said groups to said connector, a marginal relay in said connector, a low resistance release relay in one of said selectors and a high resistance release relay in the other of said selectors, means for connecting the release relay of one of said selectors in series with the connector relay when a connection is established from said selector to said connector, said connector relay being adapted to be operatively energized when connected in series with said low resistance release relay, but not when connected in series with said high resistance release relay, a pair of guarding potential circuits, and means controlled by said connector relay for bringing one or the other of said guarding potential circuits into use.

Signed by me at Chicago, Ill., this 5th day of August, 1913.

TALBOT G. MARTIN.

Witnesses:
 ALBERT ANDERSEN,
 G. YANOCHOWSKI.